(12) United States Patent
Iketaki

(10) Patent No.: US 8,536,543 B2
(45) Date of Patent: Sep. 17, 2013

(54) SUPER-RESOLUTION MICROSCOPE

(75) Inventor: Yoshinori Iketaki, Oume (JP)

(73) Assignee: Olympus Corporation, Tokyo (JP)

( * ) Notice: Subject to any disclaimer, the term of this patent is extended or adjusted under 35 U.S.C. 154(b) by 359 days.

(21) Appl. No.: 12/961,917

(22) Filed: Dec. 7, 2010

(65) Prior Publication Data
US 2011/0140000 A1 Jun. 16, 2011

(30) Foreign Application Priority Data

Dec. 11, 2009 (JP) ................ 2009-281179

(51) Int. Cl.
*G01N 21/64* (2006.01)
(52) U.S. Cl.
USPC .................... 250/458.1; 250/459.1
(58) Field of Classification Search
USPC .......................... 250/458.1, 459.1
See application file for complete search history.

(56) References Cited

U.S. PATENT DOCUMENTS

| | | | | |
|---|---|---|---|---|
| 5,866,911 | A * | 2/1999 | Baer ................ | 250/458.1 |
| 6,667,830 | B1 * | 12/2003 | Iketaki et al. ......... | 359/368 |
| 2001/0045529 | A1 * | 11/2001 | Iketaki et al. ......... | 250/493.1 |
| 2006/0290924 | A1 * | 12/2006 | Iketaki et al. ......... | 356/300 |
| 2007/0291353 | A1 * | 12/2007 | Iketaki et al. ......... | 359/385 |
| 2010/0014156 | A1 * | 1/2010 | Iketaki ................ | 359/385 |

FOREIGN PATENT DOCUMENTS

| | | |
|---|---|---|
| JP | A-H08-184552 | 7/1996 |
| JP | A-2001-100102 | 4/2001 |

OTHER PUBLICATIONS

Bokor, Nandor et al., "On polarization effects in fluorescence depletion microscopy," Optics Communications (2007), vol. 272, No. 1, pp. 263-269.
Iketaki, Yoshinori et al., "Investigation of the center intensity of first- and second-order Laguerre-Gaussian beams with linear and circular polarization," Optics Letters (2007), vol. 32, No. 16, pp. 2357-2359.
Iketaki, Yoshinori et al., "Demonstration of Super-Resolution Microscopy Using a High Numerical-Aperture Oil-Immersion Objective Lens," e-Journal of Surface Science and Nanotechnology (2008), vol. 6, pp. 175-179.

* cited by examiner

*Primary Examiner* — David Porta
*Assistant Examiner* — Casey Bryant
(74) *Attorney, Agent, or Firm* — Scully, Scott, Murphy & Presser, P.C.

(57) ABSTRACT

Provided is a super-resolution microscope for observing a specimen containing a substance having two or more excited quantum state, which includes: a light source section that outputs a first illumination light for exciting the substance from a stable state to a first quantum state, and a second illumination light for further transitioning the substance to other quantum state; an optical system including a microscope objective lens and condensing the first illumination light and the second illumination light, each outputted from the light source section, onto the specimen in a manner that these lights are partially overlapped with each other; a detection section that detects an optical response signal emitted from the specimen in response to condensing of the first illumination light and the second illumination light; and, a polarization controlling element provided with a polarizing member that converts a polarization state of the first illumination light or the second illumination light, and a phase modulation section integrally formed with the polarizing member and spatially modulating a phase of the second illumination light.

24 Claims, 19 Drawing Sheets

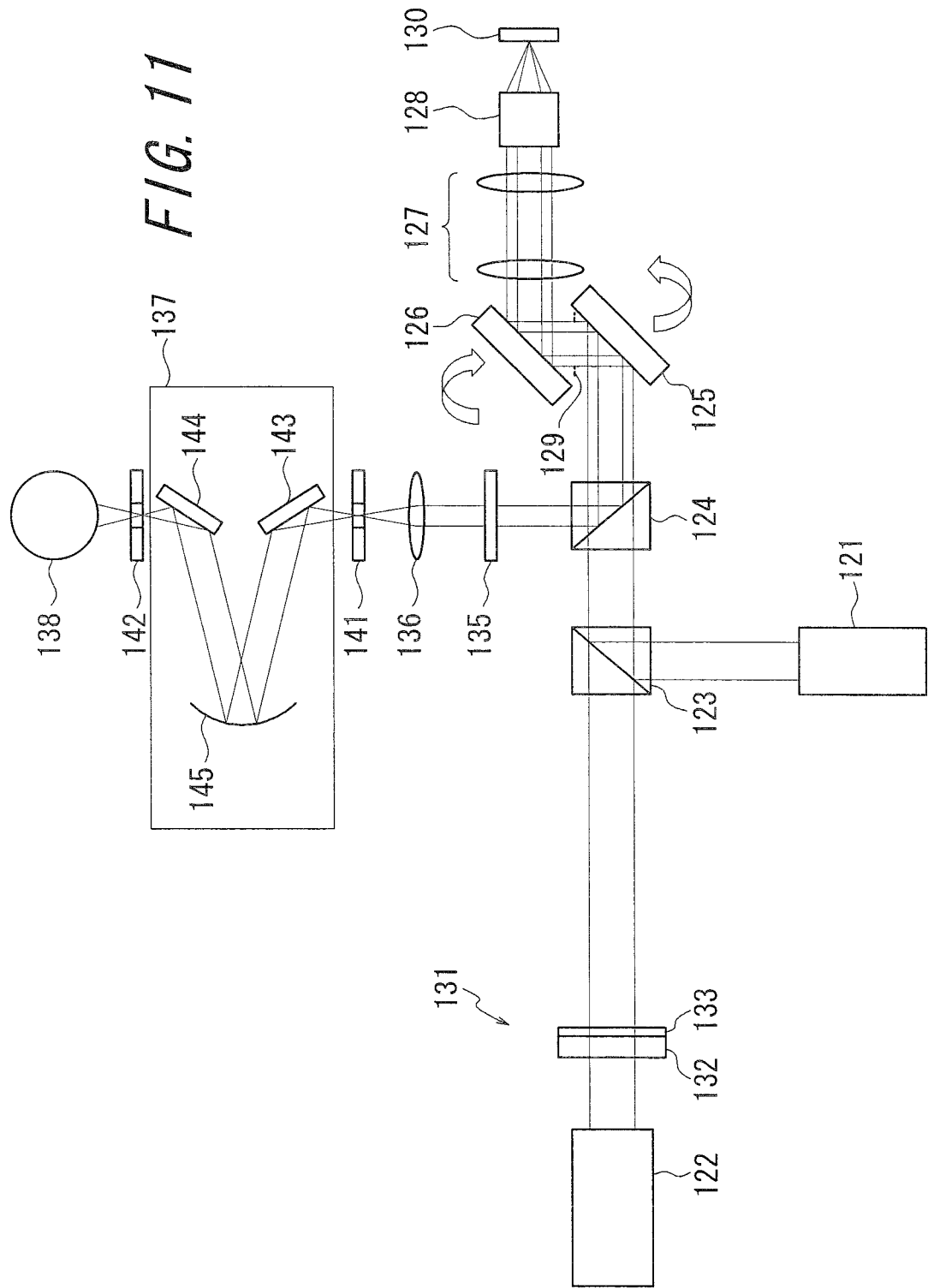

SUPER-RESOLUTION MICROSCOPE

CROSS-REFERENCE TO RELATED APPLICATION

The present application claims priority from Japanese Application No. 2009-281179, filed on Dec. 11, 2009, the content of which is incorporated herein by reference.

TECHNICAL FIELD

The present invention relates to a microscope, and, in particular, to a super-resolution microscope for observing a specimen with a high spatial resolution by illuminating the specimen with lights of plural wavelengths.

BACKGROUND OF THE INVENTION

Conventionally, optical microscope techniques have been widely used for a long period of time, and various types of microscopes have been developed. In recent years, with the advancement of peripheral techniques thereof such as a laser technique and an electronic graphic technique, microscope systems having further high performance have been developed.

In view of the background as described above, there is proposed a high-performance microscope that can not only control a contrast of an image to be obtained, but also perform a chemical analysis by using a double resonance absorption process induced by illuminating a specimen with lights of plural wavelengths (for example, see Patent Literature 1).

This microscope selects, by using the double resonance absorption, a specific molecule, and observes absorption and fluorescence caused by a specific optical transition. This theory will be described with reference to FIGS. 14 through 17. FIG. 14 shows electronic structures of valence orbits of molecules constituting the specimen. First, an electron in a valence orbit owned by the molecule in a ground state (S0 state: stable state) illustrated in FIG. 14 is excited to a first excited state (S1 state) illustrated in FIG. 15 by a light of a wavelength $\lambda_1$. Then, similarly, excitement is performed to a second excited state (S2 state) illustrated in FIG. 16 by a light of another wavelength $\lambda_2$. With this excited state, the molecule returns to the ground state as illustrated in FIG. 17 while emitting fluorescence or phosphorescence.

In a microscope method using the double resonance absorption process, an absorption image or luminous image is observed by using the absorption process in FIG. 16 or the emission of the fluorescence or phosphorescence in FIG. 17. With this microscope method, a molecule constituting a specimen is first excited to the S1 state as illustrated in FIG. 15 with the light of resonance wavelength $\lambda_1$ by a laser beam and the like, and at this time, the number of molecules in the S1 state in a unit volume increases as the intensity of the irradiation light increases.

A linear absorption coefficient is given as a product of an absorption cross-section per molecule and the number of molecules per unit volume, and hence, in the exciting process as illustrated in FIG. 16, the linear absorption coefficient for the subsequently irradiated resonance wavelength $\lambda_2$ strongly depends on the intensity of the first applied light of the wavelength $\lambda_1$. That is, the linear absorption coefficient for the wavelength $\lambda_2$ can be controlled with the intensity of the light of the wavelength $\lambda_1$. This indicates that a contrast of the transmission image can be completely controlled with the light of the wavelength $\lambda_1$ by irradiating the specimen with the lights of the wavelength $\lambda_1$ and the wavelength $\lambda_2$ to obtain the transmission image by the wavelength $\lambda_2$.

When the deexcitation process by fluorescence or phosphorescence from the excited state of FIG. 16 to the ground state shown in FIG. 17 is possible, the luminous intensity is proportional to the number of molecules in the S1 state. This makes it possible to control an image contrast, even when used as a fluorescent microscope.

Further, this microscope method using the double resonance absorption process can be used not only for controlling the image contrast described above but also for performing the chemical analysis. That is, since the outermost valence orbit illustrated in FIG. 14 has an energy level intrinsic to each molecule, the wavelength $\lambda_1$ is different for molecules. At the same time, the wavelength $\lambda_2$ is also intrinsic to each molecule.

When the specimen is illuminated with the conventional single wavelength, it is possible to observe the absorption image or fluorescent image of a specific molecule in some degree. However, in general, since some molecules overlap their wavelength ranges of absorption band with each other, it is impossible to accurately identify the chemical composition of the specimen when the specimen is illuminated with the single wavelength.

On the other hand, according to the microscope using the double resonance absorption process, the molecules to absorb or illuminate the light are defined by using the two wavelengths of the wavelength $\lambda_1$ and the wavelength $\lambda_2$, so that the chemical composition of the specimen can be identified more accurately than the conventional method. In a case where the valence electron is to be excited, only a light having a specific electric-field vector with respect to a molecular axis is intensively absorbed. Thus, it is possible to identify the direction of orientation even for the same molecule when an absorption image or a fluorescence image is obtained while determining the polarization directions of the wavelength $\lambda_1$ and the wavelength $\lambda_2$.

In recent years, there has been proposed a fluorescent microscope which has a high spatial resolution exceeding a diffraction limit by using the double resonance absorption process (for example, see Patent Literature 2).

FIG. 18 is a conceptual diagram illustrating the double resonance absorption process of molecules, in which a molecule in the ground state S0 is excited to the first excited state S1 with the light of the wavelength $\lambda_1$ and further to the second excited state S2 with the light of the wavelength $\lambda_2$. Note that FIG. 18 illustrates that fluorescence from this second excited state S2 is extremely weak for some kind of molecules.

The molecule having such optical properties as illustrated in FIG. 18 experiences a remarkably interesting phenomenon. FIG. 19 is a conceptual diagram illustrating the double resonance absorption process similar to FIG. 18, in which the X axis of abscissa represents an extension of a spatial distance, and a spatial area A1 which is irradiated with the light of the wavelength $\lambda_2$ and a spatial area A0 which is not irradiated with the light of the wavelength $\lambda_2$ are shown.

In FIG. 19, a great number of the molecules in the S1 state are generated in this spatial area A0 by the excitation with the light of the wavelength $\lambda_1$, and at this time, a fluorescent light emitted from the spatial area A0 with a wavelength $\lambda_3$ can be observed. In the spatial area A1, however, the irradiation of the light of the wavelength $\lambda_2$ excites most of the molecules in the S1 state instantly to the S2 state at a higher level, so that the molecules in the S1 state disappears. The phenomenon as described above is confirmed in several molecules. As a result, the fluorescence of the wavelength completely disappears in the spatial area A1, and further, the fluorescence from the S2 state does not exist intrinsically, so that the fluorescence itself is completely inhibited in the spatial area A1 (fluorescence inhibiting effect). Therefore, the fluorescence exists only in the spatial area A0.

Considered from the application field of the microscope, this result has a remarkably important meaning. That is, in the conventional scanning type laser microscope, a laser beam is condensed to produce a micro beam with a condensing lens, thereby to scan a target specimen. In this case, the size of the micro beam is determined by the diffraction limit which is determined by a numerical aperture of a condensing lens and a wavelength. As a result, a higher spatial resolution cannot be expected in principle.

However, in a case of FIG. 19, the fluorescent area is inhibited by partially overlapping two types of lights, light of the wavelength of $\lambda_1$ and light of the wavelength of $\lambda_2$, in a spatial manner, and hence, by paying attention to the irradiation area of the light of the wavelength of for example, the fluorescent area can be made narrower than the diffraction limit which is determined by a numerical aperture of a condensing lens and a wavelength, which makes it possible to substantially improve the spatial resolution. Hereinafter, the light of the wavelength of $\lambda_1$ is referred to as a pump light, and the light of the wavelength of $\lambda_2$ is referred to as an erase light. Therefore, by adopting this principle, it is possible to realize a super-resolution microscope such as a super-resolution fluorescent microscope, which exceeds the diffraction limit and utilizes the double resonance absorption process.

For example, in a case where the Rhodamine 6G dye is employed, the molecule of the Rhodamine 6G is excited from the S0 state to the S1 state by irradiating the light (pump light) of the wavelength of 532 nm, thereby emitting the fluorescent light having a peak at the wavelength of 560 nm. At this time, when the light (erase light) of the wavelength of 599 nm is irradiated, the double resonance absorption process occurs, and the molecule of the Rhodamine 6G transit to the S2 state where the fluorescent light is less likely to be emitted. That is, the fluorescent is inhibited by irradiating the pump light and the erase light to the Rhodamine 6G at the same time.

FIG. 20 is a configuration diagram illustrating a main portion of the conventionally proposed super-resolution microscope. This super-resolution microscope is based on an ordinary laser scanning type fluorescent microscope, and is formed mainly by three independent units, namely, a light source unit 210, a scan unit 230, and a microscope unit 250.

The light source unit 210 has a light source 211 for a pump light, and a light source 212 for an erase light. The pump light emitted from the light source 211 for the pump light is inputted into a dichroic prism 213, is reflected by the dichroic prism 213, and then, is emitted. The erase light emitted from the light source 212 for the erase light is polarized by the polarizing element 214; a phase of the thus polarized light is modulated by a phase plate 215; the modulated light is inputted into and passes through the dichroic prism 213; and, the passing light is combined with the pump light on the same axis, thereby being emitted.

In a case of observing the specimen dyed with the Rhodamine 6G dye, the light source 211 for the pump light is configured such that Nd:YAG laser is employed, and a light of the wavelength of 532 nm, which is a second harmonic wave of the light from the laser, is emitted as the pump light. Further, the light source 212 for the erase light is configured such that Nd:YAG laser and a Raman shifter are employed, the second harmonic wave of the Nd:YAG laser is converted into the light of the wavelength of 599 nm by the Raman shifter, and the converted light is emitted as the erase light.

The phase plate 215 is configured such that phase differences of the erase light make $2\pi$-turn around an optical axis. For example, as illustrated in FIG. 21, the phase plate 215 has independent eight areas around the optical axis, and is formed by etching a glass plate such that the respective phases are shifted by $\frac{1}{8}$ of the wavelength of the erase light. By condensing the light passing through the phase plate 215, a hollow-shaped erase light in which electric fields are cancelled at the optical axis can be generated.

In the scan unit 230, the pump light and the erase light emitted from the light source unit 210 on the same axis are made pass through a half prism 231, and, the lights are swingingly scanned in a two-dimensional direction by two galvano mirrors 232 and 233, and are outputted to the microscope unit 250, which will be described later. Further, the scan unit 230 is configured such that: the fluorescent light arriving from the microscope unit 250 traces the reverse path to the ongoing path, and is separated by the half prism 231; the separated fluorescent light passes through a projection lens 234, a pinhole 235, and notch filters 236 and 237; and, the light is received by a photomultiplier 238.

In FIG. 20, the galvano mirrors 232, 233 are illustrated so as to be swingable in the same plane for the purpose of simplifying the drawing. Note that the notch filters 236 and 237 are used for removing the pump light and the erase light contained in the fluorescent light. The pinhole 235 is an important optical element serving as a confocal optical system, and allows only the fluorescent light emitted at a specific fault plane existing in a target specimen to pass through.

The microscope unit 250 is a so-called ordinary fluorescent microscope, in which the pump light and the erase light arriving from the scan unit 230 are reflected by a half prism 251, and are condensed by a microscope objective lens 252 on an target specimen 253 containing a molecule in three electronic states including at least the ground state. Further, the fluorescent light emitted from the target specimen 253 is collimated by the microscope objective lens 252 again, is reflected by the half prism 251, and is returned again to the scan unit 230, and part of the fluorescent light passing through the half prism 251 is guided to an eyepiece lens 254 so as to be able to make the visual observation as the fluorescence image.

According to the super-resolution microscope described above, it is possible to inhibit the fluorescent light other than the light in the vicinity of the optical axis where the intensity of the erase light is zero at the light condensing point of the target specimen 253, and, as a result, measure only a fluorescent-labeler molecule existing in a region narrower than the extension of the pump light. Therefore, by arranging fluorescent signals of the respective measurement points in a two-dimensional manner by using a computer, it is possible to form a microscope image having a resolution higher than the spatial resolution of the diffraction limit.

Incidentally, the super-resolution microscope using an optical response with two colors of illumination described above strongly depends on polarization, and an expected optical property cannot be obtained when a predetermined polarization condition is not satisfied. For example, it has been known that the above-described fluorescent inhibiting effect strongly appears when the polarization directions of the two colors of illumination lights are the same, and the effect is weakened when the polarization directions are orthogonal to each other (see, for example, Non-Patent Literature 1).

Further, a polarization state greatly affects a beam shape of the erase light. That is, in a case of employing the phase plate 215 shown in FIG. 21, the beam shape varies depending on the polarization state. For example, it has been known that, in a case where the erase light is converted into a circularly polarized light by the polarizing element 214 and then is condensed with a lens having a high numerical aperture, a polarization component in the optical axis direction occurs in accordance with the turning direction of the electric field in the circularly polarized light, and, the intensity at the center does not become zero, whereby it is impossible to obtain the beam shape having the hollow structure (see, for example, Non-Patent Literature 2). This is because, when a light having the orthogonal electric-field vectors in a plane is condensed, electric-field vector components parallel to the optical axis direction are generated independently of each other; and, the components are added one after another when these components are parallel, although the intensity at the center becomes zero when these are antiparallel.

As described above, when the erase light does not have the hollow-shaped beam on the focal plane, the fluorescence of the pump light is inhibited at the center portion, which leads to deterioration in the spatial resolution. Therefore, it is necessary to optimize the polarization state of the pump light and the erase light in order to obtain a desired super-resolution effect.

Further, in order to obtain the sufficient super-resolution effect, it has been known that it is necessary for the hollow portion of the erase light and the peak point of the pump light to coincide with each other on the focal plane with an accuracy of about 30 nm (see, for example, Non-Patent Literature 3).

Yet further, in a case of employing the phase plate 215 shown in FIG. 21, the electric field on the optical axis cannot be cancelled on the focal plane, and an ideal hollow spot cannot be obtained, when the center portion of the phase plate 215 and the center portion of the erase light are not completely matched, that is, when the phase of the erase light is not completely reversed at a position symmetrical with respect to the optical axis. As a result, the super-resolution effect cannot be obtained.

Therefore, conventionally, the polarizing element 214 and the phase plate 215 are configured so as to be independently adjustable, in order to obtain the super-resolution effect.

Conventional Art References
Patent Literatures
Patent Literature 1: Japanese Patent Application Laid-open No. 8-184552
Patent Literature 2: Japanese Patent Application Laid-open No. 2001-100102
Non-Patent Literatures
Non-Patent Literature 1: N. Bokor, Y. Iketaki, T. Watanabe, K. Daigoku, N. Davidson and M. Fujii, Opt. Comm., 272 (1), (2007) 263-269.
Non-Patent Literature 2: Y. Iketaki, T. Watanabe, N. Bokor and M. Fujii, Opt. Left., 32 (2007) 2357-2359
Non-Patent Literature 3: Y. Iketaki, T. Watanabe, N. Bokor and M. Fujii, e-Journal of Surface Science and Nanotechnology, 6 (2008) 175-179

SUMMARY OF THE INVENTION

The first aspect of the invention is a super-resolution microscope for observing a specimen containing a substance having at least two or more excited quantum state, which includes: a light source section that outputs a first illumination light for exciting the substance from a stable state to a first quantum state and a second illumination light for further transitioning the substance to other quantum state; an optical system including a microscope objective lens and condensing the first illumination light and the second illumination light, each outputted from the light source section, onto the specimen in a manner that these lights are partially overlapped with each other; a detection section that detects an optical response signal emitted from the specimen in response to condensing of the first illumination light and the second illumination light; and, a polarization controlling element provided with a polarizing member that converts a polarization state of the first illumination light or the second illumination light, and a phase modulation section integrally formed with the polarizing member and spatially modulating a phase of the second illumination light.

The second aspect of the invention resides in the super-resolution microscope according to of the first aspect, wherein the polarization controlling element is configured so that the second illumination light has a minimum value of light intensity in an area on the specimen where the second illumination light is partially overlapped with the first illumination light.

The third aspect of the invention resides in the super-resolution microscope according to of the second aspect, wherein the polarization controlling element does not spatially modulate a phase of the first illumination light, and the first illumination light has a maximum value of light intensity on an optical axis in the area on the specimen.

The fourth aspect of the invention resides in the super-resolution microscope according to of the first aspect, wherein the phase modulation section includes plural areas that are formed to have steps by layering of an optical medium film or by an etching process such that a phase of the second illumination light is reversed at a position symmetrical with respect to an optical axis.

The fifth aspect of the invention resides in the super-resolution microscope according to of the first aspect, wherein the polarization controlling element comprises the phase modulation section and an area other than the phase modulation section around the phase modulation section concentrically divided when viewed in the axial direction, and wherein the second illumination light that passes through the phase modulation section and the second illumination light that passes through the area other than the phase modulation section have opposite signs in terms of electric-field amplitude.

The sixth aspect of the invention resides in the super-resolution microscope according to of the first aspect, wherein the phase modulation section is formed by a multi-layer film having a reflective effect or a transmission-type phase modulation effect on the first illumination light, and having a transmission-type phase modulation effect on the second illumination light.

The seventh aspect of the invention resides in the super-resolution microscope according to of the first aspect, wherein the substance is a fluorescent substance, and the second illumination light has a wavelength that inhibits emission of fluorescence of the fluorescent substance.

The eighth aspect of the invention resides in the super-resolution microscope according to of the first aspect, wherein the substance is a fluorescent substance, the second illumination light has a wavelength that changes a spectrum of fluorescence of the fluorescent substance, and, the detection section is provided with a wavelength-band selection section that transmits the spectrum of the fluorescence emitted from the fluorescent substance in response to irradiation of the first illumination light, and blocks the spectrum of the fluorescence emitted from the fluorescent substance in response to irradiation of the second illumination light.

The ninth aspect of the invention resides in the super-resolution microscope according to of the first aspect, wherein the polarization controlling element is rotatable around an optical axis of the second illumination light.

The tenth aspect of the invention resides in the super-resolution microscope according to of the first aspect, wherein the polarizing member functions as a half-wavelength plate with respect to the second illumination light, and polarization directions of the first illumination light and the second illumination light each condensed onto the specimen are parallel.

The eleventh aspect of the invention resides in the super-resolution microscope according to of the first aspect, wherein the polarizing member functions as a quarter wavelength plate with respect to the second illumination light, and a polarization direction of at least one of the first illumination light and the second illumination light each condensed onto the specimen is a circularly polarized light.

The twelfth aspect of the invention resides in the super-resolution microscope according to of the eleventh aspect, wherein the first illumination light and the second illumination light each condensed onto the specimen are circularly polarized lights having polarizing rotation directions opposite to each other.

The thirteenth aspect of the invention resides in the super-resolution microscope according to of the first aspect, wherein the polarization controlling element is of reflective type that deflects the first illumination light or the second illumination light.

The fourteenth aspect of the invention resides in the super-resolution microscope according to of the first aspect, wherein the polarization controlling element contains a liquid crystal or photonic crystal as the polarizing member.

The fifteenth aspect of the invention resides in the super-resolution microscope according to of the first aspect, wherein the optical system has a stick lens having an endoscopic optical system coupled on an object side of the microscope objective lens.

The sixteenth aspect of the invention resides in the super-resolution microscope according to of the first aspect, wherein the microscope objective lens is configured in a manner that can spatially scan the first illumination light and the second illumination light on the specimen.

BRIEF DESCRIPTION OF THE DRAWINGS

FIG. 11 is a diagram illustrating a schematic configuration of a main portion of an optical system of a super-resolution microscope according to Fifth Embodiment of the present invention;

DESCRIPTION OF THE PREFERRED EMBODIMENTS

First, an overview of a polarization controlling element usable for a super-resolution microscope according to the present invention will be described.

Figure 1A:
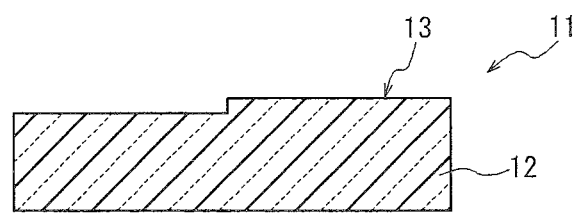
FIGS. 1A and 1B are a sectional view and a plan view, respectively, each schematically illustrating a configuration of a first example of a polarization controlling element usable for a super-resolution microscope according to the present invention.
Figure 1B:
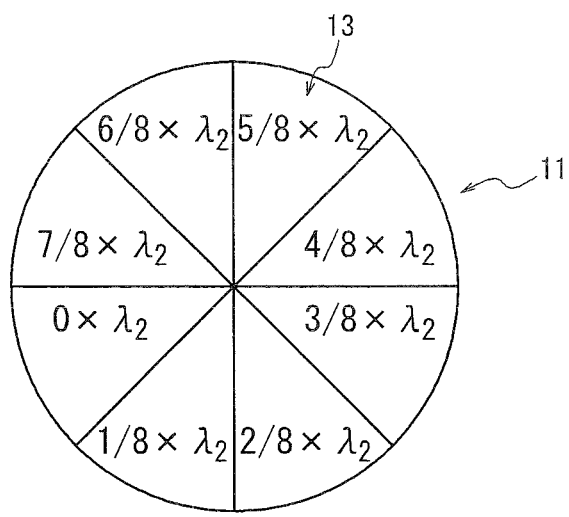

FIGS. 1A and 1B are a sectional view and a plan view, respectively, each schematically illustrating a configuration of a first example of a polarization controlling element. The polarization controlling element 11 is arranged on an independent optical path of a stimulus light, and includes a transmission-type polarizing member 12 and a phase modulation section 13 formed on the emission side of the polarizing member 12. The polarizing member 12 is made of a birefringence material. In a case of employing a crystal for example, the crystal is cut so as to have a phase difference and an angle with respect to a crystal axis, and the surface thereof is polished.

The polarizing member 12 having a phase difference of ½ wavelength with respect to the wavelength of an incident light can convert a linearly polarized light of the incident light into a linearly polarized light having been rotated by a given angle, and emit it, for example. Further, the polarizing member 12 having a phase difference of ¼ wavelength with respect to the wavelength of the incident light can convert the linearly polarized light of the incident light into a circularly polarized light, and emit it. Yet further, by appropriately setting a direction of the crystal axis with respect to the polarization plane of the incident light, it is possible to make conversion into an ovally polarized light, which is intermediate between the former and the latter. Note that the polarizing member 12 is not limited to the crystal, and it is possible to make the polarizing member 12 from other birefringence material such as a liquid crystal or photonic crystal. Further, it is also possible to employ a Gran prism and the like as the polarization controlling element, and as a matter of course, it is possible to employ an electrooptical crystal that can electrically control the polarizing direction by the Faraday effect.

Figure 21:
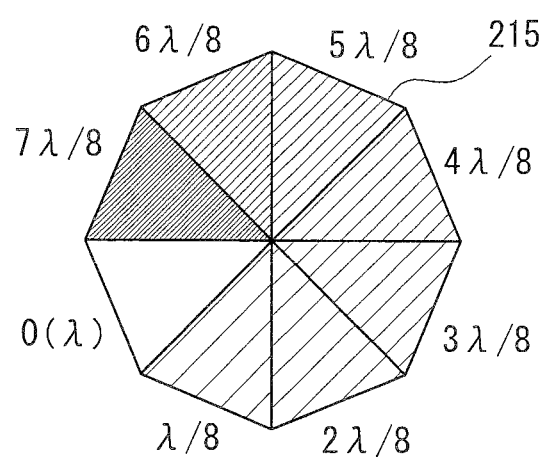

The phase modulation section 13 is formed so as to have steps in a manner that: a surface on the emitting side of the polarizing member 12 described above is divided, for example, into eight areas symmetrically around an optical axis as similar to FIG. 21; and, the phases are different for each of the axis-symmetrical areas by ⅛ of the wavelength $\lambda_2$ of the stimulus light, for example, by coating an optical thin film whose thicknesses are changed stepwise, or applying etching so as to have different depths in a stepwise manner.

When the linearly polarized stimulus light is inputted to the polarization controlling element 11 as described above, the polarization state of the stimulus light is converted by the polarizing member 12; a wave front thereof is spatially modulated by the phase modulation section 13 so as to have an axis-symmetrical phase distribution; and emission is performed. For example, when the linearly polarized stimulus light is transmitted through the polarization controlling element 11 whose polarizing member 12 is formed by a quarter wavelength plate, the polarization state is converted into the circularly polarized light, and at the same time, the wave front thereof has the axis-symmetrical phase distribution.

Therefore, by condensing the stimulus light transmitted through the polarization controlling element 11 with a microscope objective lens having a high numerical aperture as disclosed in Non-Patent Literature 2, it is possible to form an ideal ring-zone beam, at the center of which the electric field strength is completely cancelled. Further, at the time of adjusting the polarization state with the polarizing member 12 by rotating the polarization controlling element 11, the phase modulation section 13 rotates in an integrated manner, and hence, the axis of the stimulus light does not shift, and always passes through the center of the axis-symmetric phase modulation section 13. This makes it possible to condense the ring-zone stimulus light so as to have an axis-symmetric intensity distribution, which is ideal for the super-resolution microscope.

Figure 2A:
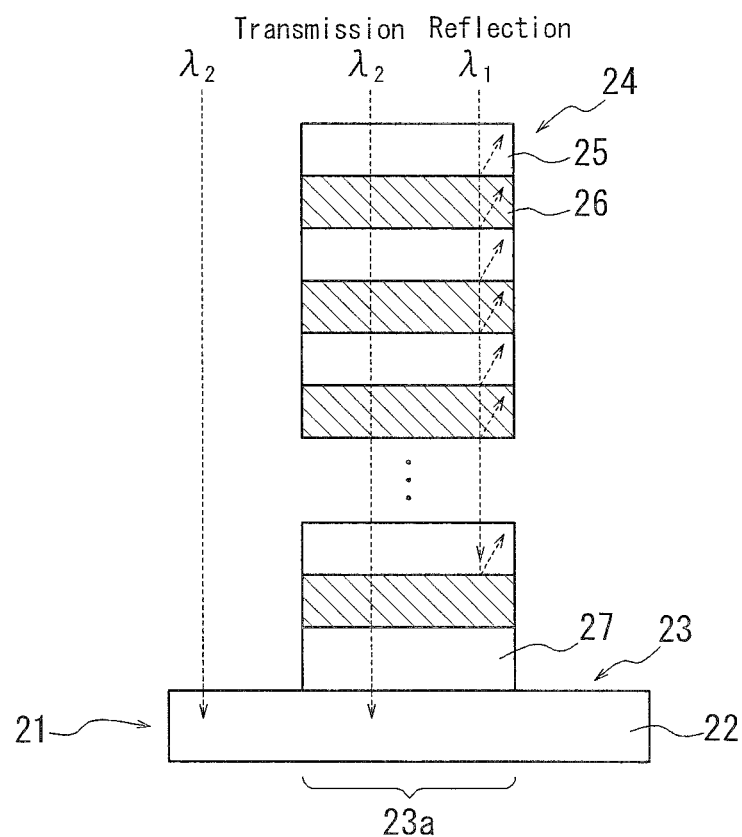
FIGS. 2A and 2B are a sectional view and a plan view, respectively, each schematically illustrating a configuration of a second example of the polarization controlling element usable for the super-resolution microscope according to the present invention.
Figure 2B:
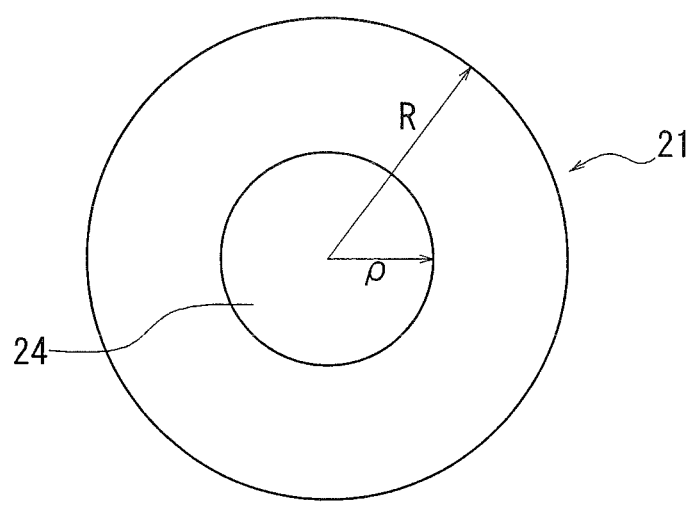

FIGS. 2A and 2B are a sectional view and a plan view, respectively, each schematically illustrating a configuration of a second example of the polarization controlling element. The polarization controlling element 21 is arranged on an optical path common to an excited light and a stimulus light, and includes a transmission-type polarizing member 22 and a phase modulation section 23 formed on a surface of the incoming surface side of the polarizing member 22. The polarizing member 22 is formed as similar to the polarizing member 12 in FIG. 1, for example, so as to convert the polarization state of the stimulus light. The phase modulation section 23 is formed such that a surface on the incoming side of the polarizing member 22 is concentrically divided, for example, into two areas in a circular pupil plane of the excited light and the stimulus light; the area corresponding to the central portion of this circular pupil plane is a modulation area 23a; and, a multilayer film 24 is coated on the modulation area 23a. In this embodiment, the multilayer film 24 functions as an optically reflective film having a reflecting function against the excited light.

As illustrated in FIG. 2A, the multilayer film 24 is configured such that a first substance 25 (refractive index $n_a(\lambda)$) and a second substance 26 (refractive index $n_b(\lambda)$), respective reflective indices of which are different against the excited light, are alternately layered by deposition on the polarizing member 22 by way of a buffer layer 27. Given that the first substance 25 and the second substance 26 have film thicknesses $d_a$ and $d_b$, respectively, in order to make these substances function as optically reflective films against the excited light, a length of the optical path is, for example, one-fourth of the length $\lambda_1$ of the excited light, and it is only necessary to satisfy the following expression (1).

$$d_a n_a(\lambda_1) = \lambda_1/4, d_b n_b(\lambda_1) = \lambda_1/4 \tag{1}$$

The multilayer film 24 designed under the condition above is not matched with an interference condition of the stimulus light having a wavelength different from the excited light, and hence, the stimulus light is not reflected, but is transmitted. At this time, the stimulus light suffers a phase delay. That is, the multilayer film 24 has an operation that spatially modulates the phase of the stimulus light, and functions as a phase plate. Therefore, in this case, when the stimulus light that passes through the multilayer film 24 is compared with the stimulus light that does not pass through the multilayer film 24, a phase difference δ expressed by the following expression (2) occurs in the same pupil plane. Note that, in the expression (2), $\lambda_2$ represents a wavelength of the stimulus light, and m represents the number of pairs in which each pair is formed by the first substance 25 and the second substance 26.

$$\delta = m\{d_a n_a(\lambda_2) + d_b n_b(\lambda_2)\} - m(d_a + d_b) \tag{2}$$

Figure 3:
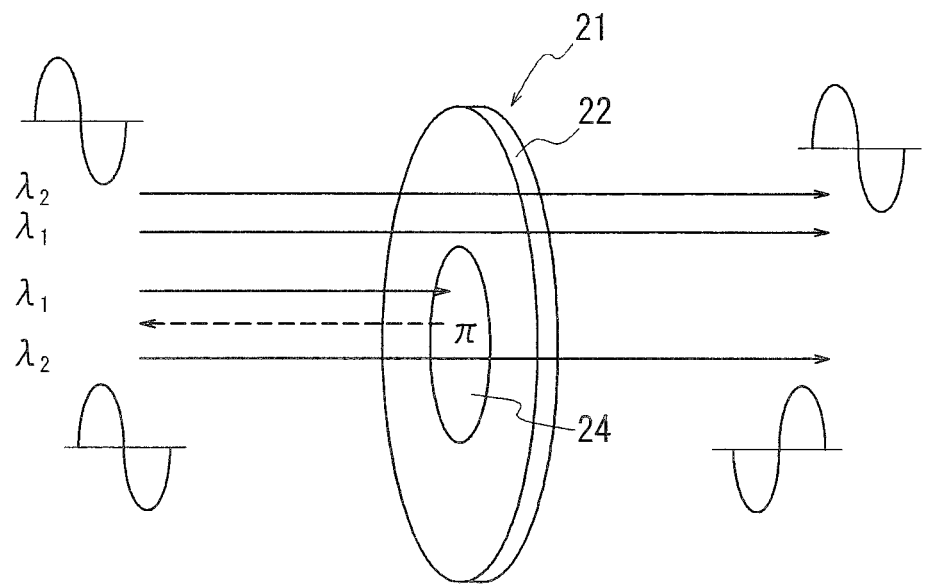
FIG. 3 is a diagram illustrating an optical property of the polarization controlling element in FIGS. 2A and 2B.

In a case where the phase difference δ satisfies the following expression (3), the values of the amplitude in terms of electric-field amplitude are completely the same but signs thereof are opposite, as illustrated in FIG. 3, when the wave front of the stimulus light that passes through the multilayer film 24 is compared with the wave front of the stimulus light that passes through the other area. Note that, in the expression (3), L represents an integer.

$$\delta = (2L+1)\lambda_2/2 \tag{3}$$

Therefore, in the pupil plane, in a case where the light intensities of the stimulus light that does not pass through the multilayer film 24 and the stimulus light that passes through the multilayer film 24 are the same, the electric field strengths are completely cancelled at the focal point by condensing the stimulus light that passes through the pupil plane. That is, at the focal plane, it is possible to obtain a doughnut-shaped condensed beam that does not have any light intensity due to the interference, that is, that has the minimum value of the light intensity. This means, for example, that a function equal to the ring-shaped phase plate disclosed in Japanese Patent No. 3993553 can be obtained.

On the other hand, the excited light is reflected by an area having the multilayer film 24, and passes through areas other than the multilayer film 24. In this case, for example, an ordinary condensed beam having the maximum value of the light intensity can be obtained as disclosed in Y. Iketaki, et. al. Opt. Lett., 19 (1994) 1804-1806.

Therefore, by inputting the excited light and the stimulus light having the same pupil diameter on the same axis to the polarization controlling element 21 illustrated in FIG. 2, and condensing the passing light, the stimulus light can be condensed to be a hollow-pattern-shaped (doughnut-shaped) beam having a hollow portion at least in the optical axis direction in the neighboring area including the light condensing point, more specifically, a capsule shape (three-dimensional dark-hole shape) or tubular shape (macaroni shape). Further, the excited light can be condensed in an ordinary shape of the condensed beam. Yet further, since the excited light and the stimulus light are condensed at the same spatial point, it is possible to omit the optical adjustments of the excited light and the stimulus light, which are the greatest problem concerning the super-resolution microscope.

It should be noted that, to input the excited light and the stimulus light into the polarization controlling element 21, it is preferable for an illumination optical system to be configured such that the excited light and the stimulus light are derived from the same single-mode fiber, and are collimated by a lens that does not have chromatic aberration, and thereby to be inputted. By configuring the illumination optical system as described above, the following effects can be expected.

(1) Since the excited light and the stimulus light are derived from the single-mode fiber, it is possible to make these lights have a perfect spherical wave. Therefore, by collimating the lights with the lens that does not have chromatic aberration, a perfect plane wave that does not have the wave aberration can be obtained, whereby the phase modulation by the polarization controlling element 21 can be further reliably performed.

(2) Since the excited light and the stimulus light are derived from the single-mode fiber and are collimated with the lens that does not have the chromatic aberration, the lights can be collimated by using the chromatic-aberration-free optical system, even when the polarization controlling element 21 is disposed in a slightly tilted manner, or the degree of parallelization of the polarizing member 22 in the polarization controlling element 21 is deteriorated. Therefore, it is possible to make image formation at the same spatial point on the specimen and solve the shift of the beam.

(3) Since the emission port of the single-mode fiber is mechanically fixed, it is possible to establish an extremely mechanically stable illumination optical system in which the light condensing points of the excited light and the stimulus light do not spatially change.

Note that the phase modulation section 23 is not limited to a configuration in which the multilayer film 24 is concentrically formed at the central portion of the two areas, and it may be possible to form the modulation area 23a having the multilayer film 24 so as to have still more ring-like areas, that is, two or more areas as is the case with a phase-type Fresnel zone plate.

Incidentally, as described above, when the stimulus light that passes through the multilayer film 24 of the polarization controlling element 21 and the stimulus light that passes through the area other than the multilayer film 24 have completely the same amplitude in terms of electric-field amplitude but signs thereof are opposite, it is a necessary condition that both the stimulus light that does not pass through the multilayer film 24 and the stimulus light that passes through the multilayer film 24 have the same light intensities, to obtain the doughnut-shape condensed beam at the focal plane. More specifically, when the intensities of the stimulus lights incident to the pupil plane are uniform, it is necessary to satisfy the following expression (4), where $S_A$ is an area of the multilayer film 24, and $S_0$ is an area of the total pupil plane.

$$S_A = S_0/2 \tag{4}$$

In particular, when, in FIG. 2B, the shape of the pupil is a circle having a radius R, and the shape of the modulation area 23a forming the multilayer film 24 is a circle having a radius ρ, R/ρ is $2^{1/2}$ from the expression (4). This is a limited optimal condition. That is, when the shapes or sizes of the pupil and the modulation area 23a can be adjusted, a condition that "the stimulus light that passes through the modulation area 23a and the stimulus light that passes through the area other than the modulation area 23a have completely the same amplitude in terms of electric-field amplitude but signs thereof are opposite" is not necessarily an absolute one, but an extremely broad optimal condition "signs of the stimulus light that passes through the modulation area 23a and the stimulus light that passes through the area other than the modulation area 23a are opposite" can be given.

Here, a maximum amplitude of the electric field of the stimulus light is $E_e$, and a phase delay angle by the multilayer film 24 is $\delta_e$. In this case, when the stimulus light passes through the multilayer film 24 and the stimulus light that passes through the area other than the multilayer film 24 are examined on the same pupil plane in terms of their amplitude, an amplitude intensity Ein of the stimulus light that passes through the multilayer film 24 is expressed by the following expression (5). Note that, in the following expression (5), $\omega_e$, represents a frequency of the stimulus light, and $k_e$ and $r_e$, each of which has a right-pointing arrow on the upper portion thereof, represent a wave number vector and a position vector, respectively.

$$E\text{in} = E_e \sin(\omega_e t + \vec{k}_e \vec{r}_e + \delta_e) \tag{5}$$

On the other hand, an amplitude intensity Eout of the stimulus light that passes through the area other than the modulation area 23a is expressed by the following expression (6).

$$E\text{out} = E_e \sin(\omega_e t + \vec{k}_e \vec{r}_e) \tag{6}$$

When the expression (5) and the expression (6) described above are compared, it is found the phases are shifted by $\delta_e$. Therefore, since Ein and Eout take arbitrary value between $E_e$ and $-E_e$, these may take values having different signs depending on the value of $\delta_e$. In particular, the case of the expression (3) described above is a special case in which the absolute values of the amplitudes also take the same value.

As described above, when having different signs, Ein and Eout are wider condition as expressed by the following expression (7) regardless of the condition of the expression (4) described above.

$$(S_0 - S_A)E\text{out} + S_A E\text{in} = 0 \tag{7}$$

That is, in the expression (7), the electric fields at the focal point of the stimulus light can be cancelled to be zero by adjusting the proportion or phase difference δ between $S_0$ and $S_A$.

Therefore, when Ein and Eout have different signs from each other, the condition of the expression (7) can be realized by adjusting the proportion between $S_0$ and $S_A$ even if the condition of the expression (3) is not satisfied. More specifically, since the area $S_A$ of the multilayer film 24 is adjustable and the area $S_0$ of the entire pupil diameter is also adjustable with an iris, the super resolution can be realized by further looser adjustment as compared with the conventional methods.

As described above, the condition of the polarization controlling element 21 for the stimulus light has been described. On the other hand, for the excited light, it is possible to present a further broad applicable condition.

Figure 4:
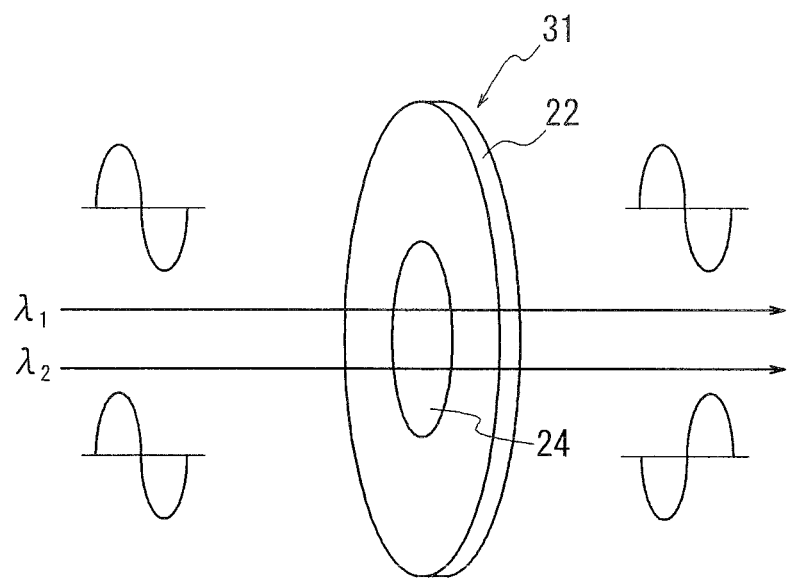
FIG. 4 is a diagram illustrating an optical property of a third example of the polarization controlling element usable for the super-resolution microscope according to the present invention.

FIG. 4 is a diagram illustrating a third example of an optical property of the polarization controlling element. In the configuration shown in FIG. 2, a polarization controlling element 31 is configured such that the multilayer film 24 on the polarizing member 22 functions as the transmission-type phase plate against the excited light.

In FIG. 4, $E_p$ represents a maximum amplitude of the electric field of the excited light, and $\delta_p$ represents a phase delay angle by the multilayer film 24. In this case, when the excited light that passes through the multilayer film 24 and the excited light that passes through the other area than the multilayer film 24 are examined in terms of the amplitude on the same pupil plane, the amplitude intensity Ein of the excited light that passes through the multilayer film 24 is expressed by the expression (8). Note that $\omega_p$ represents a frequency of the excited light, and $k_p$ and $r_p$, each of which has a right-pointing arrow on the upper portion thereof, represent a wave number vector and a position vector, respectively.

$$E\text{in} = E_p \sin(\omega_p t + \vec{k}_p \vec{r}_p + \delta_p) \tag{8}$$

On the other hand, an amplitude intensity Eout of the excited light that passes through the area other than the multilayer film 24 is expressed by the following expression (9).

$$E\text{out} = E_p \sin(\omega_p t + \vec{k}_p \vec{r}_p) \tag{9}$$

When the expression (8) and the expression (9) described above are compared, it is found that the phases are shifted by $\delta_p$ as similar to the case of the stimulus light. Therefore, since Ein and Eout take arbitrary value between $E_r$ and $-E_r$, in the case of the excited light, these values are set to have the same sign by adjusting the value of $\delta_p$.

In this case, as illustrated in FIG. 4, since the excited light that passes through the multilayer film 24 and the excited light that passes through the other area than the multilayer film 24 have the same polarity, the electric fields thereof are not cancelled, differently from the case of the stimulus light, but are added to each other when the excited light is condensed. As a result, in this case, it is possible to obtain a Gaussian-type condensing spot having the intensity at the focal point. That is, at the time of designing the multilayer film 24, $\delta_p$ and $\delta_e$ are adjusted such that the polarities thereof are made the same in the case of the excited light, and are made different from each other in the case of the stimulus light. More specifically, since the excited light and the stimulus light have the different wavelengths, the refractive indices thereof at the multilayer film 24 are different. Therefore, by utilizing the difference in the refractive indices, the number of layer or the thickness thereof is made optimized. For example, by using a transparent substance in which the difference in the refractive indices between the excited light and the stimulus light is sufficiently large in a wavelength region in the vicinity of the absorption end where the abnormal dispersion is strong, it is possible to configure the simplest polarization controlling element having the same effect as the effect described above only with a single layer, without the need of multiple layering.

Figure 5A:
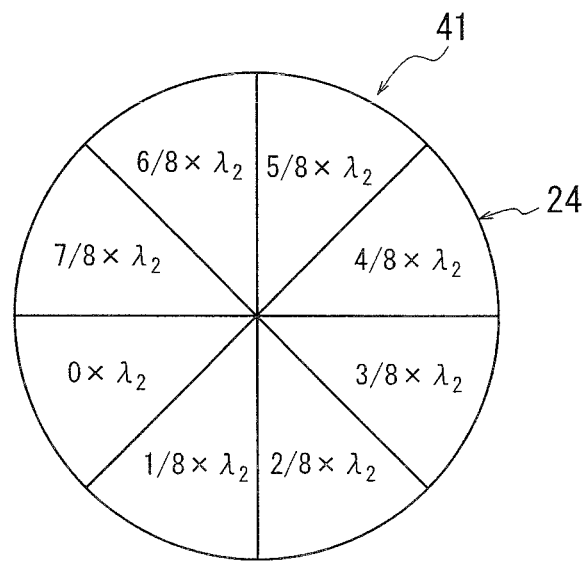
FIGS. 5A and 5B are a sectional view illustrating a schematic configuration and a diagram illustrating an optical property, respectively, each relating to a fourth example of the polarization controlling element usable for the super-resolution microscope according to the present invention.
Figure 5B:
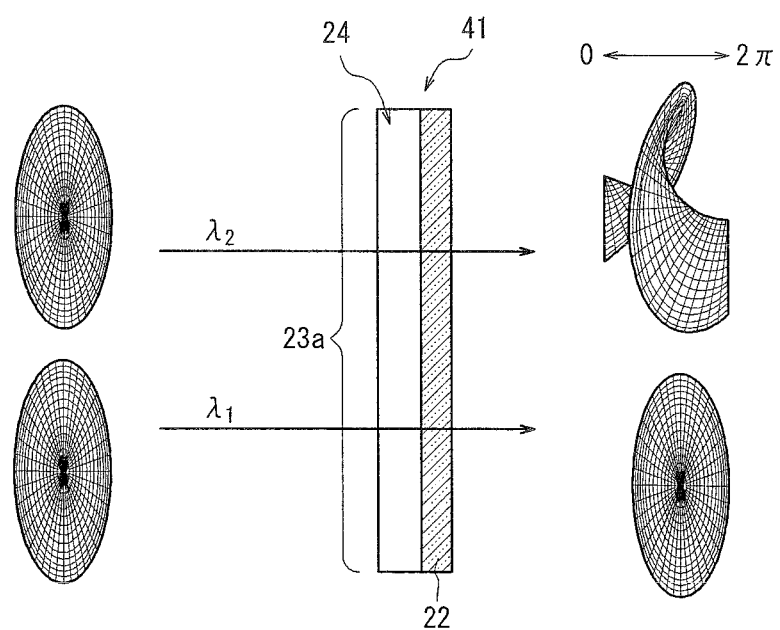

FIGS. 5A and 5B are diagrams for explaining a fourth example of the polarization controlling element; FIG. 5A are a plan view illustrating a schematic configuration of the polarization controlling element; and, FIG. 5B is a diagram for explaining an optical property thereof. Based on the configuration shown in FIG. 4, the polarization controlling element 41 is formed such that: the entire area of the incident light flux on the polarizing member 22 is the modulation area 23a; the modulation area 23a is divided into plural areas—eight areas in FIG. 5A as similar to the case of FIG. 1—around the optical axis; and, the multilayer film 24 is formed on the divided eight areas such that phases are different for the respective eight areas by $\lambda_2/8$ of the wavelength $\lambda_2$ of the stimulus light. Here, as illustrated in FIG. 5B in which phase distribution of the excited light and the stimulus light are schematically illustrated, the multilayer film 24 is configured so as to transmit the excited light while the phase thereof remains unchanged as similar to the case of FIG. 4, and to transmit the stimulus light in a manner that performs phase modulation to the whole of the stimulus light to become a Laguerre-Gaussian beam whose phase distribution turns at $2\pi$.

By using the polarization controlling element 41 as illustrated in FIG. 5 to condense the excited light and the stimulus light that pass through this polarization controlling element 41 onto the specimen with the microscope objective lens, it is possible to form, on the focal plane, a spot of the excited light having the maximum value of the light intensity on the optical axis, and a hollow-shaped spot of the stimulus light having the minimum value of the light intensity on the optical axis, without losing the light intensity, as similar to the case of the third example.

Figure 6:
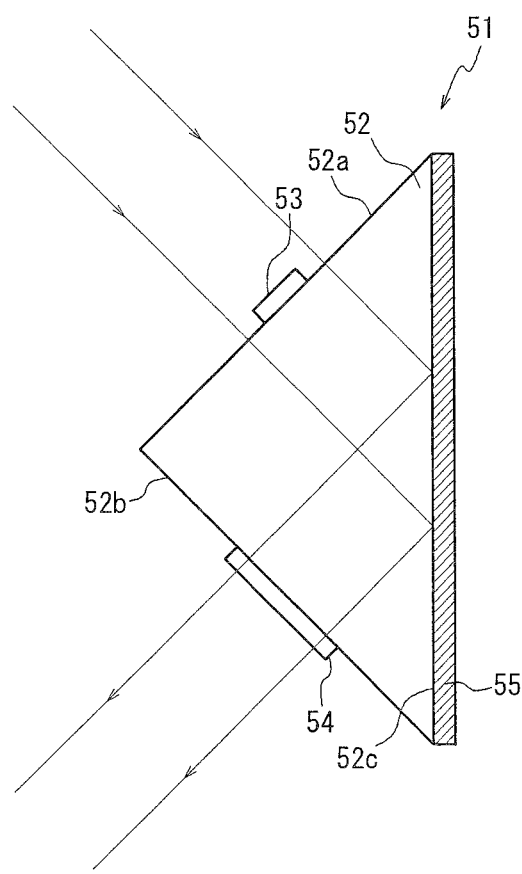
FIG. 6 is a sectional view illustrating a schematic configuration of a fifth example of the polarization controlling element usable of the super-resolution microscope according to the present invention.

FIG. 6 is a sectional view illustrating a schematic configuration of a fifth example of the polarization controlling element. This polarization controlling element 51 is of reflective type, and is arranged on an optical path common to an excited light and a stimulus light, as similar to the case of the second through the fourth examples. The polarization controlling element 51 illustrated in FIG. 6 has: a prism member 52; a multilayer film 53 for phase modulation formed on the incoming surface 52a; a polarizing member 54 formed on an emitting surface 52b; and a reflective film 55 formed on a reflective surface 52c. The prism member 52 is made of, for example, glass. The polarizing member 54 and the multilayer film 53 are formed by combining the polarizing member and the multilayer film as illustrated in the second through the fourth examples as appropriate. Further, the reflective film 55 is formed of, for example, aluminum film.

The polarization controlling element 51 illustrated in FIG. 6 reflects the excited light (wavelength $\lambda_1$) and the stimulus light (wavelength $\lambda_2$) entering from the incoming surface 52a of the prism member 52, deflects it by 90 degrees, and causes the deflected lights to emit from the emitting surface 52b. At this time, the stimulus light is phase modulated with the multilayer film 53 provided on the incoming surface 52a so as to obtain a doughnut-shaped condensed beam at the focal plane, and the polarization state of the stimulus light is converted into a desired polarization state with the polarizing member 54 provided on the emitting surface 52b.

By using the reflective-type polarization controlling element 51 as described above, it is possible to improve a degree of layout freedom of parts constituting the super-resolution microscope. Note that, in FIG. 6, the polarizing member 54 may be provided on the reflective surface 52c of the prism member 52. Further, it may be possible to form the prism member 52 itself by using a birefringence material such as a crystal, liquid crystal or photonic crystal such that the prism member 52 has a polarizing function that converts the polarization state of the stimulus light, and a deflection function that deflects light paths of the excited light and the stimulus light by 90 degrees.

As described above, by configuring the polarization controlling element such that the polarizing member and the phase modulation section are combined therein and building in the polarization controlling element within the super-resolution microscope, it is possible to easily coincide the hollow portion of the stimulus light and the peak point of the excited light on the focal plane with an accuracy of about 30 nm while suppressing the occurrence of tilt or shift of the optical axis, and easily realize the super-resolution effect, by performing the rotation adjustment or centering only for the polarization controlling element. Further, it is possible to form the polarizing member and the phase modulation section as the polarization controlling element, which is one type of optical member, with ease and at low cost. Note that, in the first example described above, the phase modulation section 13 may be formed on the incoming surface side of the polarizing member 12. Further, in the third through the fifth examples, the multilayer film may be formed on the emitting surface side, provided that, in the fifth example of FIG. 6, the multilayer film 53 is formed on the incoming surface 52a of the prism member 52 as illustrated in FIG. 6 in a case where the multilayer film 53 reflects the excited light. Yet further, in the second through the fifth examples, the polarizing member may be configured so as to convert the polarization state of the excited light. Still yet further, the polarization controlling element of the second through the fifth examples may be arranged on the single optical path of the stimulus light. In this case, naturally, the condition for the stimulus light is not necessary.

Hereinbelow, embodiments of the super-resolution microscope using the polarization controlling element described above according to the present invention will be described with reference to the drawings.

(First Embodiment)

Figure 7:
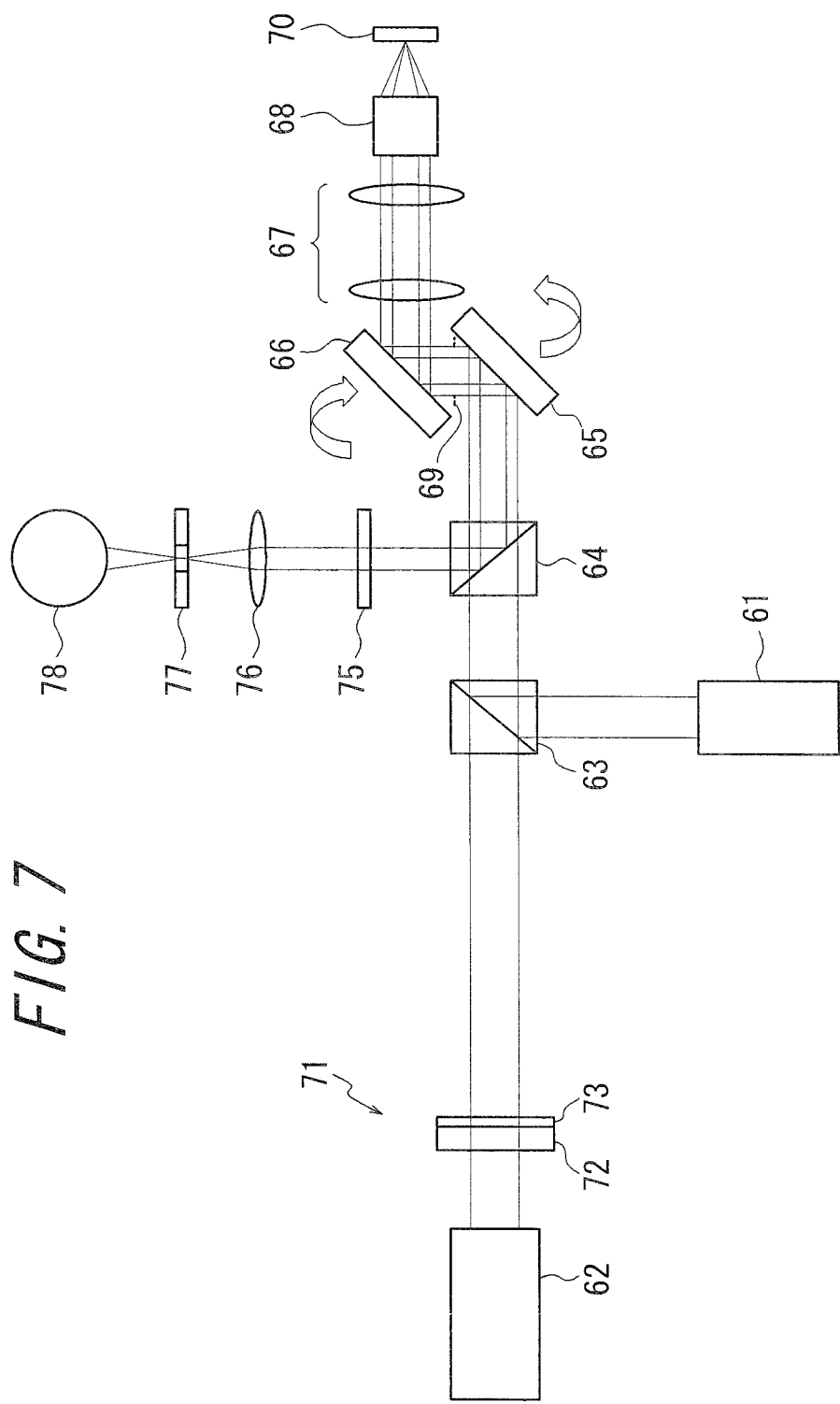
FIG. 7 is a diagram illustrating a schematic configuration of a main portion of an optical system of a super-resolution microscope according to First Embodiment of the present invention.

FIG. 7 is a diagram illustrating a schematic configuration of a main portion of an optical system of a super-resolution microscope according to First Embodiment of the present invention. The super-resolution microscope is used for observing a specimen dyed with fluorescent dye, and is provided with a light source 61 for an excited light and a light source 62 for a stimulus light constituting a light source section. The excited light outputted from the light source 61 for an excited light is reflected by a dichroic mirror 63, and then, passes through a polarizing beam splitter 64. Thereafter, the light is swingingly scanned in a two-dimensional direction by two galvano mirrors 65 and 66, passes through a pupil projection lens system 67, and is condensed onto a target specimen 70 by a microscope objective lens 68. Note that, in FIG. 1, two galvano mirrors 65 and 66 are made swingable in the same plane, for the purpose of simplifying the drawing.

On the other hand, the stimulus light outputted from the light source 62 for the stimulus light passes through a polarization controlling element 71, and is inputted into the dichroic mirror 63. This light passes through the dichroic mirror 63, and is combined with the excited light from the light source 61 for the excited light on substantially the same axis. Then, the light passes through the polarizing beam splitter 64, is swingingly scanned in the two-dimensional direction by the galvano mirrors 65 and 66, passes through the pupil projection lens system 67, and is condensed onto the target specimen 70 by the microscope objective lens 68.

On the other hand, the light from the target specimen 70 is collimated by the microscope objective lens 68, passes through the pupil projection lens system 67, the galvano mirrors 66, 65, and is inputted into the polarizing beam splitter 64. Then, after a desired polarization component of the light is reflected by the polarizing beam splitter 64, a fluorescent light is derived (is transmitted) by a fluorescent light separation filter 75, and the transmitted fluorescent light passes through a condensing lens 76 and a confocal pinhole 77, and is received by a light detection unit 78 formed by a photomultiplier constituting a detection section.

In the super-resolution microscope illustrated in FIG. 7, a pupil plane of the microscope objective lens 68 is projected between the galvano mirrors 65, 66 by the pupil projection lens system 67 to form a conjugate pupil plane 69. With this configuration, a spatial scanning of an illumination light by the galvano mirrors 65, 66 are performed with the pupil plane 69 as an axis.

In this embodiment, for convenience of explanation, observation is made to a specimen dyed with a xanthin-based dye such as Rhodamine 6G. Accordingly, for example, Nd:YVO4 solid-state laser is employed as the light source 61 for an excited light 61, and the light outputted therefrom at a second harmonic wave (wavelength of 532 nm) of its oscillation wavelength of 1064 nm is used as the excited light (pump light). Further, for example, Kr laser is employed as the light source 62 for the stimulus light, and the light outputted therefrom at its oscillation wavelength of 647.1 nm is used as the stimulus light (erase light).

Further, the polarization controlling element 71 has, for example, the first example configuration as exemplarily illustrated in FIG. 1. Here, the polarizing member 72 of the polarization controlling element 71 is configured to function as a quarter wavelength plate with respect to the erase light. With this configuration, the linearly polarized erase light arriving from the light source 62 for the stimulus light is converted into a circularly polarized light in a predetermined polarizing rotation direction, and the erase light converted into the circularly polarized light is phase modulated by a phase modulation section 73. In this case, the polarizing member 72 has a thickness of about 2 mm, and on the other hand, a height of a step formed by an optical thin film or etching constituting the phase modulation section 73 is as small as about 1 µm. Therefore, the phase modulation section 73 does not have any adverse effect on the polarizing function by the polarizing member 72.

Note that, although, ideally, the polarization controlling element 71 is arranged at the conjugate pupil plane 69 located between the two galvano mirrors 65, 66, the space between the galvano mirrors 65, 66 is about 5 mm in reality, and it is difficult to arrange the polarization controlling element 71 as described above. However, practically, deterioration of the image formation performance is negligible even if the polarization controlling element 71 is placed at any position, provided that the position of the polarization controlling element 71 is located on the optical path of the erase light on the incoming side and before the galvano mirror 65.

Further, the pump light outputted from the light source 61 for an excited light is converted into a linearly polarized light, or, is converted, by an not-shown polarizing member, into a circularly polarized light having the opposite direction to the polarizing rotation direction of the erase light by the polarization controlling element 71, and is condensed by the microscope objective lens 68.

According to this embodiment, since the polarization controlling element 71 formed integrally by the polarizing member 72 and the phase modulation section 73 is used, it is possible to covert the erase light into the circularly polarized light in the predetermined polarization rotation direction, for example, in a state where the polarization controlling element 71 is centered so as to coincide the center of the phase modulation section 73 with the optical axis of the erase light, with such an easy operation that rotation adjustment is performed in a plane perpendicular to the optical axis. With this configuration, at the time when the pump light and the erase light are condensed by the microscope objective lens 68 having a high numerical aperture, it is possible to make the erase light have a symmetric doughnut beam on the focal plane in which electric field components in the optical axis direction are cancelled. Further, it is possible to easily coincide the hollow portion of the erase light and the peak point of the pump light with an accuracy of about 30 nm, and easily realize the super-resolution effect, without causing the optical axis of the erase light to tilt or shift. Yet further, in particular, when the polarization state of the pump light is a circularly polarized light having the direction opposite to the polarization rotation direction of the erase light, an effect can be obtained in which the fluorescent light of the molecules scattering at random can be averagely detected.

(Second Embodiment)

Figure 8:
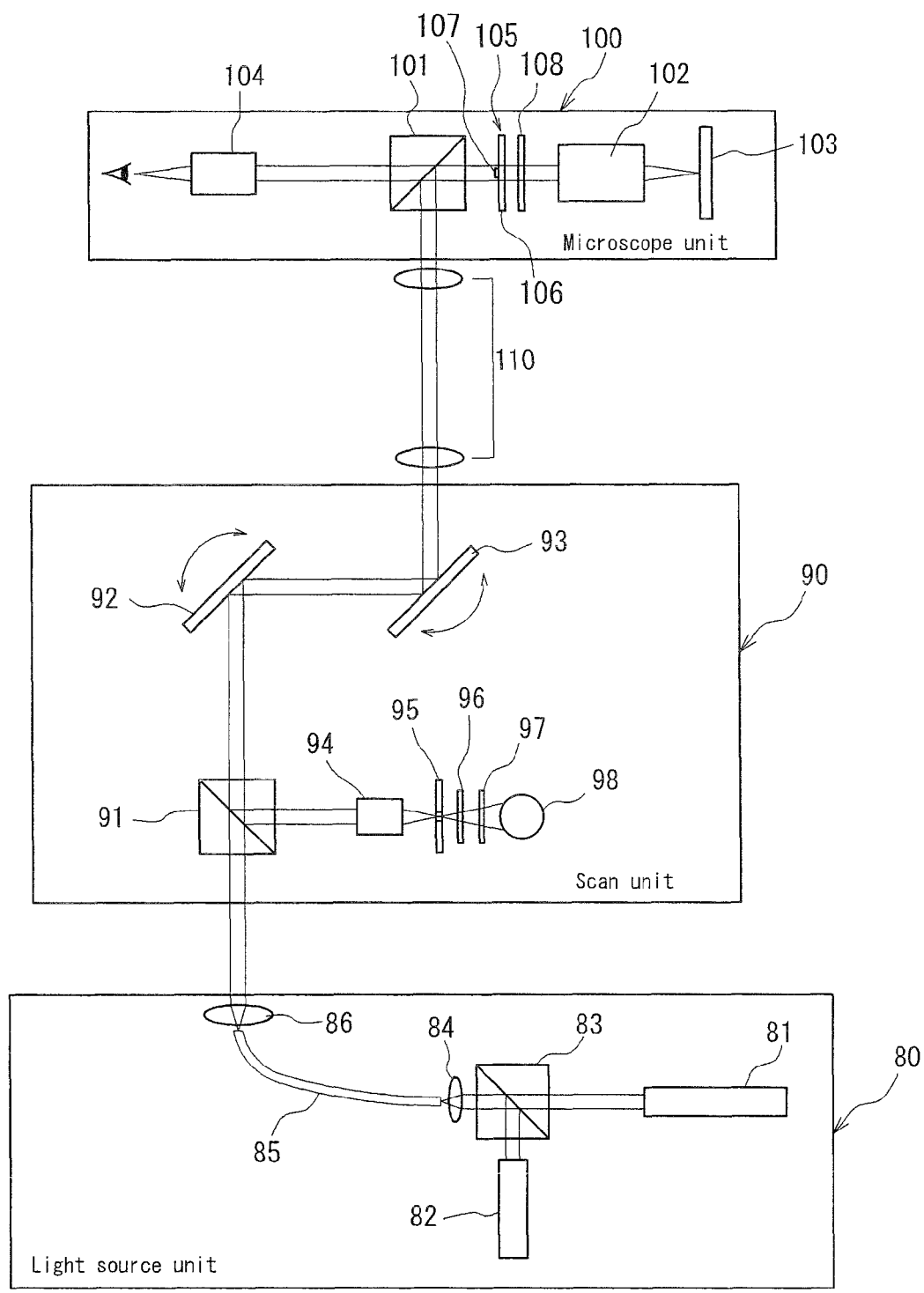
FIG. 8 is a diagram illustrating a schematic configuration of a main portion of an optical system of a super-resolution microscope according to Second Embodiment of the present invention.

FIG. 8 is a diagram illustrating a schematic configuration of a main portion of a super-resolution microscope according to Second Embodiment of the present invention. The super-resolution microscope mainly has three independent units, namely, a light source unit 80, a scan unit 90, and a microscope unit 100. The scan unit 90 and the microscope unit 100 are optically combined through a pupil projection lens system 110.

The light source unit 80 constituting a light source section includes: a light source 81 for an excited light: a light source 82 for a stimulus light; a beam combiner 83 formed by a dichroic prism and a polarizing prism; a fiber condensing lens 84; a single-mode fiber 85; and a fiber collimator lens 86. After the excited light (pump light) outputted from the light source 81 for the excited light and the stimulus light (erase light) outputted from the light source 82 for the stimulus light are combined by the beam combiner 83 on substantially the same axis, the combined lights pass through the fiber condensing lens 84, and are inputted into the same single-mode fiber 85 on substantially the same axis, thereby being emitted from the emission port of the single-mode fiber 85 as a perfect spherical wave in which emission solid angles are aligned. The pump light and the erase light emitted from the single-mode fiber 85 are converted into a plane wave by a chromatic-aberration-free fiber collimator lens 86, and are inputted into the scan unit 90.

In this embodiment, in order to observe the specimen dyed with a Rhodamine 6G dye, for example, an He—Ne laser that outputs continuous waves is employed as the light source 81 for the excited light and, an oscillation line at a wavelength of 543 nm outputted from this is employed as the pump light. Further, for example, the He—Ne laser that outputs continuous waves is employed as the light source 82 for the stimulus light and, an oscillation line at a wavelength of 633 nm outputted from this is employed as the erase light. Therefore, an optical system including a polarization controlling element, which will be described later, is optimized on the basis of these wavelengths.

In the scan unit 90, the pump light and the erase light emitted from the light source 80 pass through a polarizing beam splitter 91; are swingingly scanned in the two-dimensional direction by two galvano minors 92 and 93; pass through the pupil projection lens system 110; and are emitted to the microscope unit 100.

In the microscope unit 100, the pump light and the erase light arriving from the scan unit 90 through the pupil projection lens system 110 are reflected by a half prism 101, and are condensed by a microscope objective lens 102 onto a target specimen 103 dyed with the Rhodamine 6G dye. Further, a fluorescent light emitted at the target specimen 103 is collimated by the microscope objective lens 102, and is reflected by the half prism 101. Then, the fluorescent light passes through the pupil projection lens system 110, and is returned to the scan unit 90. At the same time, part of the fluorescent light passing through the half prism 101 is guided to an eyepiece 104 so as to be able to be visually observed as a fluorescence image. Note that the microscope objective lens 102 is illustrated so as to include its lens barrel.

Further, in the scan unit 90, a desired polarization component of the fluorescent light arriving from the microscope unit 100 through the pupil projection lens system 110 is made trace the reverse path to the outgoing path, and is separated by the polarizing beam splitter 91. The separated fluorescent light passes through a projection lens 94, a pinhole 95, and notch filters 96 and 97, and, is received by a light detection unit 98 formed by a photomultiplier constituting a detection section.

It should be noted that the pinhole 95 allows only the fluorescent light emitted at a specific fault plane in the target specimen to pass through, and the notch filters 96, 97 remove the pump light and the erase light contained in the fluorescent light.

Similar to FIG. 7, in the super-resolution microscope illustrated in FIG. 8, a pupil plane of the microscope objective lens 102 is projected between the galvano mirrors 92, 93 by the pupil projection lens system 110 to form a conjugate pupil plane. With this configuration, a spatial scanning of an illumination light by the galvano mirrors 92, 93 are performed with the pupil plane as an axis.

In this embodiment, on an optical path common to the pump light and the erase light, a polarization controlling element 105 having the configuration exemplarily illustrated in FIG. 4, and an iris (variable iris) 108 regulating a beam diameter are arranged at or in the vicinity of the pupil plane in the microscope unit 100.

The polarization controlling element 105 is configured such that a polarizing member 106 functions as a quarter wavelength plate with respect to the erase light. A multilayer film 107 is configured such that: $SiO_2$ having a refractive index of 1.52 at a wavelength of 532 nm is coated at a thickness of 532.7 nm as the buffer layer 27 illustrated in FIG. 2; and, $TaO_5$ having a refractive index of 2.16 at a wavelength of 532 nm, and, $SiO_2$ having a refractive index of 1.52 at a wavelength of 532 nm are alternately layered on this buffer layer 27 by eleven layers through deposition, thickness of which are 62.8 nm for $TaO_5$ and 89.9 nm for $SiO_2$. The multilayer film 107 functions as a transparent member for the pump light, and functions as a phase modulation element that delays phases by ½ wavelength ($\pi$) for the erase light.

Further, by disposing the polarization controlling element 105 in a plane perpendicular to the optical axis by rotation adjustment, the erase light beam is converted into the circularly polarized light in a predetermined polarization rotation direction, a phase of the erase light is spatially modulated, and the spatially modulated erase light and the pump light not having been spatially modulated pass through the iris 108, and are condensed on the specimen 103 by a chromatic-aberration-free microscope objective lens 102.

The iris 108 regulates beam diameters of the pump light and the erase light passing through the polarization controlling element 105 so as to make the erase light have a perfect hollow beam at the focal plane. That is, assuming that intensity distribution at the pupil plane is uniform, in a case where the shape of the pupil is a circular having a radius R, and the shape of the modulation area 23a is a circular having a radius $\rho$ as illustrated in FIG. 2, $R/\rho$ is $2^{1/2}$ in order to satisfy the expression (4). However, with a general laser scanning microscope, the intensity distribution of the beam is not uniform, and has a gauss-shaped distribution. Therefore, in order to form the perfect hollow beam, it is necessary to adjust $R/\rho$ in accordance with the expression (7) described above. Therefore, an outer diameter of the beam is adjusted by the iris 108 disposed immediately after the pupil plane to optimize $R/\rho$. Further, the iris 108 can adjust the error of the phase delay of the erase light transmitting the multilayer film 107 of the polarization controlling element 105.

It should be noted that the pump light outputted from the light source 82 for the excited light is converted into a linearly polarized light, or, is converted, by an not-shown polarizing member, into a circularly polarized light having the opposite direction to the polarizing rotation direction of the erase light by the polarization controlling element 105, and is inputted into the beam combiner 83.

As described above, according to this embodiment, after combined on the same axis, the erase light and the pump light are entered into the polarization controlling element 105. Therefore, it is possible to form a hollow beam of the erase light on the same axis as the pump light, by converting the erase light into the circularly polarized light in the predetermined polarization rotation direction by the polarizing member 106 of the polarization controlling element 105, and then delaying the phase relatively between the erase that passes through the multilayer film 107 and the erase light that does not passes through the multilayer film 107 by about $\pi$, for example, in a state where the polarization controlling element 105 is centered such that the center thereof coincides with the optical axis, with an easy operation in which rotation adjustment is made in a plane perpendicular to the optical axis, without causing the optical axis of the erase light to tilt or shift. Further, since the loss in the amount of erase light does not occur in the polarization controlling element 105, it is possible to realize a significant super-resolution effect with a minimum necessary power of the erase light outputted from the light source 82 for the stimulus light. Further, when the polarization state of the pump light is a circularly polarized light having the opposite direction to the polarizing rotation direction of the erase light by the polarization controlling element 105, an effect can be obtained in which the fluorescent light of the molecules scattering at random can be averagely detected.

The polarization controlling element 105 and the iris 108 are disposed on or in the vicinity of the pupil surface in the microscope unit 100; the galvano mirrors 92, 93 are disposed on or in the vicinity of a conjugate pupil plane thereof; and the pump light and the erase light are spatially scanned, whereby it is possible to suppress the occurrence of a wave aberration by the scanning. Therefore, without disturbing the condensing shape of the erase light, which affects the performances of the super-resolution microscope, it is possible to condense the pump light and the erase light on the target specimen 103 on the same axis at all times while maintaining a high image formation performance with a wide field, whereby the significant super-resolution effect can be realized.

Further, in the light source unit 80, the pump light outputted from the light source 81 for the excited light and the erase light outputted from the light source 82 for the stimulus light are combined by the beam combiner 83, and then, are outputted through the same optical system, that is, through a fiber condensing lens 84 and the single-mode fiber 85 without delivering any of the lights. Further, the pump light and the erase light each having the perfect spherical wave and emitted from single-mode fiber 85 are collimated by the fiber collimator lens 86 under the same condition. Therefore, the pump light and the erase light are condensed at totally the same image formation point on the target specimen 103 by the microscope objective lens 102 under the same divergence (beam expansion), without giving the wave aberration and without requiring any complicated optical adjustment.

(Third Embodiment)

Figure 9:
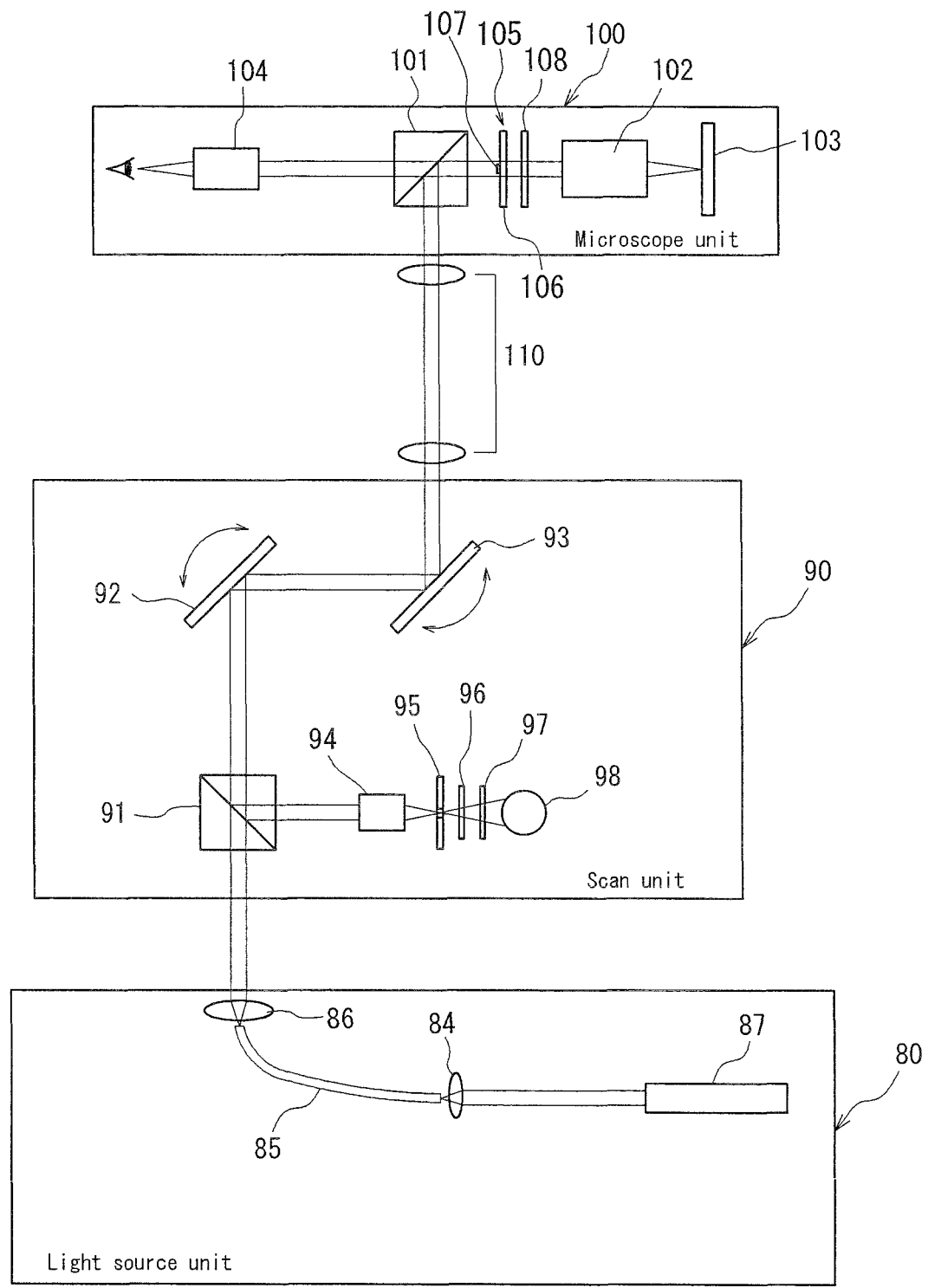
FIG. 9 is a diagram illustrating a schematic configuration of a main portion of an optical system of a super-resolution microscope according to Third Embodiment of the present invention.

FIG. 9 is a diagram illustrating a schematic configuration of a main portion of an optical system of a super-resolution microscope according to Third Embodiment of the present invention. This super-resolution microscope is based on the super-resolution microscope illustrated in FIG. 8. In the light source 80, one laser light source 87 is employed, and a laser light outputted from the laser light source 87 passes through the fiber condensing lens 84, the single-mode fiber 85, and the fiber collimator lens 86, and is inputted into the scan unit 90.

For example, a He—Ne laser that oscillates with multi-line is employed as the laser light source 87; an oscillation line at a wavelength of 543 nm is employed as the pump light; and, an oscillation line at a wavelength of 633 nm is employed as the erase light. Since other configuration and operation are similar to those in Second Embodiment, the explanation thereof is omitted.

According to this embodiment, since the pump light and the erase light are derived from one He—Ne laser at the same time, the configuration can be simplified as compared with that of Second Embodiment. Further, since it is possible to omit the operation in which the optical axes of the pump light and the erase light are adjusted and are guided into the single-mode fiber 85, which is necessary in Second Example, the adjustment can be further simplified. Since other operation and effect are similar to those in Second Embodiment, the explanation thereof is omitted.

(Fourth Embodiment)

A super-resolution microscope according to Fourth Embodiment of the present invention is based on the configuration of any one of First through Third Embodiments described above. In this super-resolution microscope, the polarizing member of the polarization controlling element functions as a half-wavelength plate with respect to the erase light. Further, the erase light condensed onto the target specimen is a linearly polarized light, and a direction of the linearly polarized light is adjusted by the polarizing member of the polarization controlling element. That is, in a configuration illustrated in FIG. 7, a polarizing member 72 of a polarization controlling element 71 is formed by a half-wavelength plate, and in a configuration illustrated in each of FIGS. 8 and 9, a polarizing member 106 of a polarization controlling element 105 is formed by a half-wavelength plate.

The pump light is condensed as a linearly polarized light onto the target specimen. At the same time, the polarization controlling element is rotated and adjusted in a plane perpendicular to the optical axis so as to match a linearly polarized erase light with a direction of the linearly polarized pump light, and is condensed onto the target specimen.

As described above, by converting the pump light and the erase light to be condensed onto the target specimen into linearly polarized lights having the same polarization direction, it is possible to maximize the fluorescent inhibiting effect and realize the favorable super-resolution effect, especially at the time of detecting the fluorescence of the dye such as Rhodamine 6G.

In the above-described embodiments, the pump light and the erase light are combined, and are condensed onto the target specimen to form a circular pump light spot and a hollow erase light spot on the target specimen. With this configuration, the intensity of the fluorescent light in the illumination area of the erase light is suppressed, the fluorescent inhibiting effect is made appear, and the light detection unit detects the fluorescence emitted from the super-resolution area where only the pump light is illuminated. That is, the total amount of the fluorescence emitted by illuminating the pump light and the erase light can be detected.

However, the fluorescent inhibiting effect for realizing the super resolution effect is not limited to the cases described above, and it may be possible to realize the fluorescent inhibiting effect by introducing a spectroscopic approach. Recently, as a dye applicable to this approach, a so-called light-activated dye that changes its fluorescence spectrum when a light having a specific wavelength is illuminated has been known. In particular, as a famous light-activated dye, a fluorescent protein called "Kaede" exists.

Figure 10A:
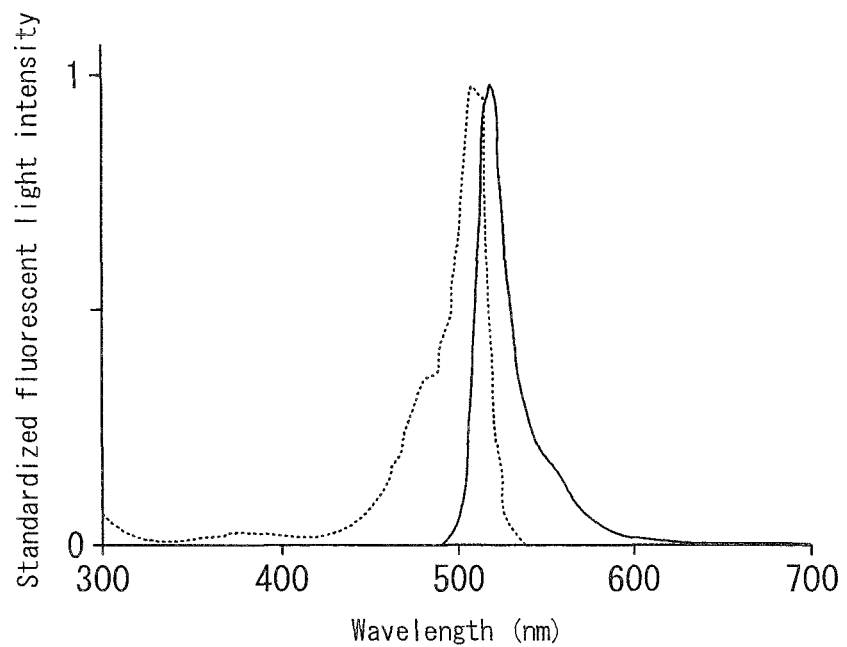
FIGS. 10A and 10B are diagrams each illustrating a dispersion spectrum of fluorescent protein dye "Kaede" before and after ultraviolet irradiation.
Figure 10B:
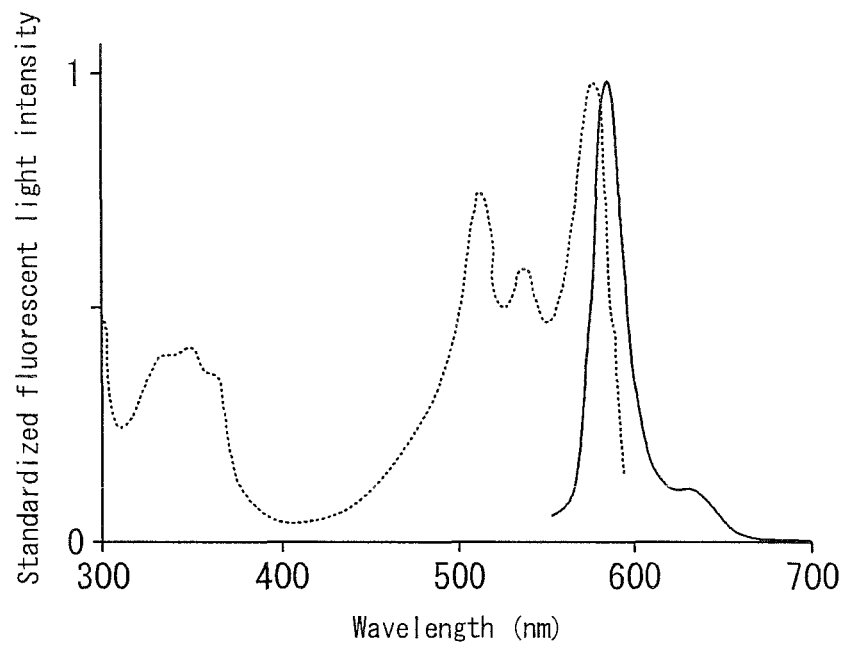

When an ultraviolet light is irradiated onto this "Kaede," a fluorescence wavelength thereof is red shifted toward the longer wavelength side. FIGS. 10A and 10B are diagrams illustrating dispersion spectrums of "Kaede" before and after the ultraviolet irradiation. FIG. 10A is a dispersion spectrum before the ultraviolet irradiation, and FIG. 10B is a dispersion spectrum after the ultraviolet having a wavelength of 355 nm is irradiated. Further, in each of FIGS. 10A and 10B, a solid line indicates an emission spectrum, and a dotted line indicates an absorption spectrum.

As can be understood from FIGS. 10A and 10B, the emission spectrum band of "Kaede" extends to the wavelength region of 500 nm to 550 nm before the ultraviolet is irradiated, and the center of the fluorescence wavelength thereof is red shifted to around 580 nm after the ultraviolet of the wavelength of 355 nm is irradiated. It is noteworthy that a fluorescent component of the wavelength band of 500 nm to 550 nm on the shorter wavelength side disappears. Therefore, in this case, for example, when a visible light having a wavelength of 488 nm is employed as the excited light and an ultraviolet light having a wavelength of 355 nm is employed as the stimulus light, it is possible to realize the super resolution effect similarly, by irradiating these lights onto the target specimen with a similar configuration to that of Examples described above; and, measuring, through a spectrograph or an optical filter, a fluorescent light on the shorter wavelength side generated from a area where only the excited light is emitted. One example configuration in this case will be described below as Fifth Embodiment of the present invention with reference to FIG. 11.

(Fifth Embodiment)

FIG. 11 is a diagram illustrating a schematic configuration of a main portion of an optical system of a super-resolution microscope according to Fifth Embodiment of the present invention. This super-resolution microscope has a light source 121 for an excited light and a light source 122 for a stimulus light, each of which constitutes a light source section. Similar to the case of FIG. 7, after reflected by a dichroic mirror 123, the excited light outputted from the light source 121 for the excited light is transmitted through a polarizing beam splitter 124. Then, the light is swingingly scanned in the two-dimensional direction by two galvano mirrors 125, 126, passes through a pupil projection lens system 127 and a microscope objective lens 128, and is condensed on a target specimen 130, which is dyed with "Kaede."

On the other hand, the stimulus light outputted from the light source 122 for the stimulus light is transmitted through a polarization controlling element 131, and is inputted into the dichroic mirror 123. Then, the light is transmitted through the dichroic mirror 123, and is combined with the excited light outputted from the light source 121 for the excite light on substantially the same optical axis. The combined lights are swingingly scanned in the two-dimensional direction by the two galvano mirrors 125, 126, pass through the pupil projection lens system 127, and are condensed by the objective lens 128 of the microscope onto the target specimen 130.

The light from the target specimen 130 is collimated by the microscope objective lens 128, passes through the pupil projection lens system 127 and the two galvano mirrors 125, 126, and is inputted into the polarizing beam splitter 124. Then, after a desired polarization component is reflected by the polarizing beam splitter 124, a fluorescent light is derived by (transmitted through) a fluorescent light separation filter 135, and the transmitted fluorescent light passes through a condensing lens 135 and a spectrograph 137, and is received by a light detection unit 138 formed by a photomultiplier constituting a detection section.

The spectrograph 137 constitutes a wavelength-band selection section, and has a confocal pinhole 141 on an incoming side, a pinhole 142 on an emitting side, two reflective mirrors 143, 144, and a reflective-type diffraction grating 145. In this spectrograph 137, the fluorescent light entered from the confocal pinhole 141 passes through the reflective mirror 143, and is reflected and diffracted by the diffraction grating 145, and the diffracted light passes through the reflective mirror 144, and is emitted from the pinhole 142 on the emitting side. By appropriately adjusting an incident angle of the light incident on the diffraction grating 145 and a diameter of the pinhole 142 on the emitting side, it is possible to derive a fluorescent light having a desired wavelength band.

In this embodiment, in order to observe the fluorescent light emitted from "Kaede," for example, Ar laser is employed as the light source 121 for the excited light, and the light having an oscillation wavelength of 488 nm therefrom is used as the excited light. Further, for example, Nd:YAG laser is employed as the light source 122 for the stimulus light, and the light at a triple harmonic wave (wavelength of 355 nm) of an oscillation wavelength of 1064 nm therefrom is used as the stimulus light.

The polarization controlling element 131 has, for example, the first example configuration exemplarily illustrated in FIG. 1. In this embodiment, the polarizing member 132 of the polarization controlling element 131 is configured so as to function as a quarter wavelength plate with respect to the stimulus light. Further, by disposing the polarization controlling element 131 in a plane perpendicular to the optical axis by rotation adjustment, the stimulus light of the linearly polarized light arriving from the light source 132 for the stimulus light is converted into the circularly polarized light in a predetermined polarization rotation direction, a phase of the stimulus light converted into the circularly polarized light is modulated by the phase modulation section 133, and a hollow stimulus light spot on the same axis as the excited light is formed on the target specimen 130.

Further, the spectrograph 137 appropriately adjusts an angle with respect to an incident light on the diffraction grating 145 and a diameter of the pinhole 142 on the emitting side so as to enable the fluorescent light having the wavelength band of 500 nm to 550 nm to pass through the pinhole. Note that the excited light outputted from the light source 121 for the excited light is converted into a linearly polarized light, or, is converted, by an not-shown polarizing member, into a circularly polarized light having the opposite direction to the polarizing rotation direction of the erase light by the polarization controlling element 131, and is condensed by the objective lens 128 of the microscope.

According to this embodiment, since the fluorescent light is red shifted in the area where the hollow spot of the stimulus light is illuminated on the target specimen 130, the light is blocked at the spectrograph 137. On the other hand, since only the excited light is illuminated in the central area of the hollow spot of the stimulus light, the fluorescent light with the wavelength of 500 nm to 550 nm generated in the central area is dispersed by the spectrograph 137, and is received by the light detection unit 138, which realizes the fluorescent inhibiting effect. Further, since the central area of the hollow spot of the stimulus light is smaller than a condensing size of the excited light, the super resolution effect can be obtained.

Therefore, the super resolution effect can be easily realized, for example, in a state where the polarization controlling element 131 is centered such that the center thereof coincides with the optical axis as similar to the embodiments described above, with an easy operation in which rotation adjustment is made in a plane perpendicular to the optical axis, and without requiring the complicated adjustment operation.

It should be noted that, in FIG. 11, the wavelength-band selection section is configured by using the spectrograph 137 so as to select the fluorescent light having the wavelength band of 500 nm to 550 nm, but a bandpass filter may be employed in lieu of the spectrograph 137. Further, the polarizing member 132 of the polarization controlling element 131 is not limited to the quarter wavelength plate. The polarizing member 132 may be formed by a half-wavelength plate, and be configured such that the stimulus light is adjusted to be the linearly polarized light in a predetermined direction and is emitted onto the target specimen 130. That is, a molecule such as "Kaede" has an orientation property specific to the molecule, and the red shifting efficiently occurs especially when the ultraviolet light linearly polarized in the specific direction with respect to a molecule axis is inputted. As described above, when the fluorescent dye molecule has a exceptionally strong polarization dependence, it is possible to realized a further significant super resolution effect in which the fluorescent inhibiting effect is maximized by assigning a molecule anisotropy a higher priority than a symmetry of the shape of the stimulus light, and condensing the stimulus light linearly polarized in the specific direction.

(Sixth Embodiment)

Figure 12:
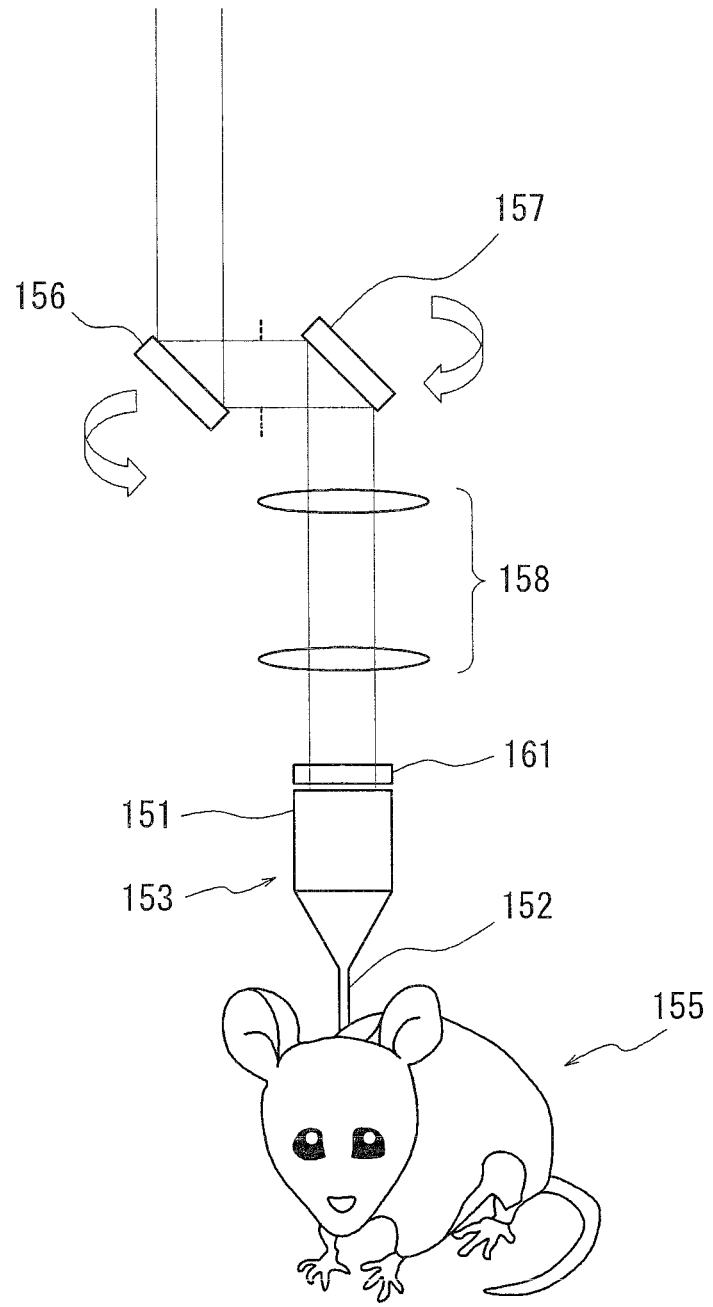
FIG. 12 is a diagram illustrating a schematic configuration of a main portion of a super-resolution microscope according to Sixth Embodiment of the present invention.

FIG. 12 is a diagram illustrating a schematic configuration of a main portion of a super-resolution microscope according to Sixth Embodiment of the present invention. This super-resolution microscope is provided with a stick lens 153 in which an endoscopic optical system 152 is coupled on an object side (top end) of a microscope objective lens 151. Biological phenomena of a biological sample 155 are observed in-vivo by directly inserting a top end portion of the endoscopic optical system 152 of the stick lens 153. The excited light and the stimulus light combined on the same axis are scanned in the two-dimension manner by galvano mirrors 156, 157, pass through a pupil projection lens 158, and are inputted into the microscope objective lens 151.

In this embodiment, a polarization controlling element 161 having, for example, the configuration exemplarily illustrated in FIG. 4 or FIG. 5 is arranged on an optical path common to the excited light and the stimulus light between the galvano mirror 157 and the microscope objective lens 151. Note that the polarizing member of the polarization controlling element 161 is configured so as to function as the quarter wavelength plate or the half-wavelength plate with respect to the stimulus light as similar to the case of the embodiment described above.

According to the super-resolution microscope of this embodiment configured as described above, the super resolution effect can be easily realized, for example, in a state where the polarization controlling element 161 is centered such that the center thereof coincides with the optical axis as similar to the embodiments described above, with an easy operation in which rotation adjustment is made in a plane perpendicular to the optical axis. This makes it possible to revolutionarily improve the spatial resolution even if the numerical aperture of the stick lens 153 cannot be higher due to the limitation on the optical design.

(Seventh Embodiment)

Figure 13:
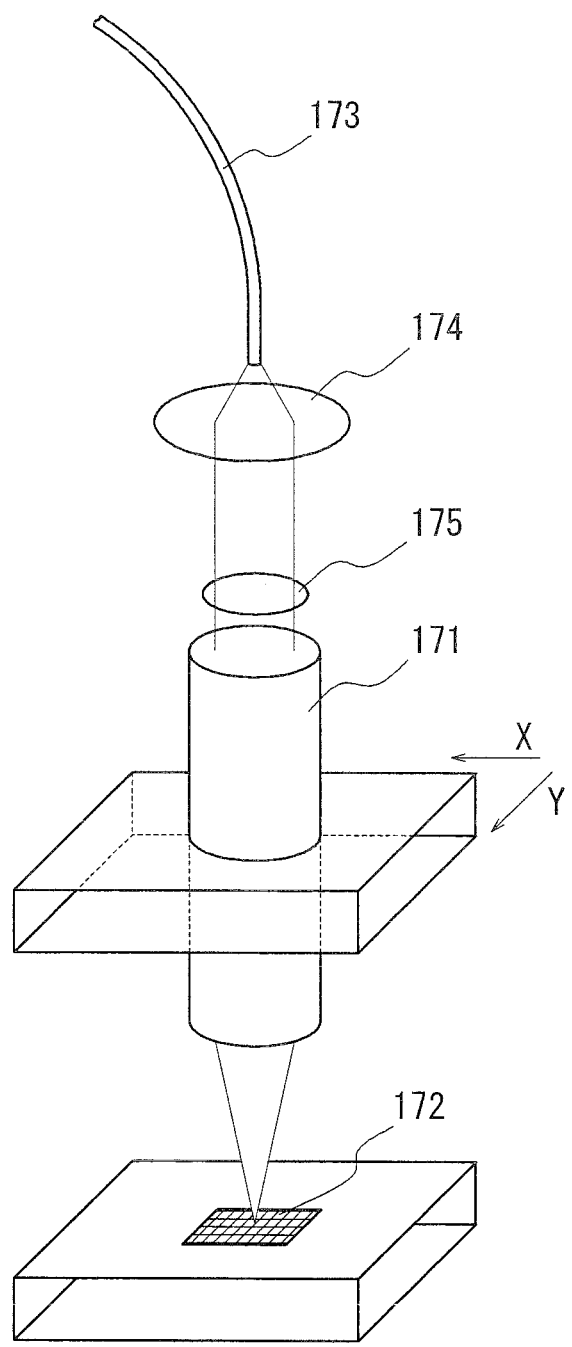
FIG. 13 is a diagram illustrating a schematic configuration of a main portion of a super-resolution microscope according to Seventh Embodiment of the present invention.
Figure 14:
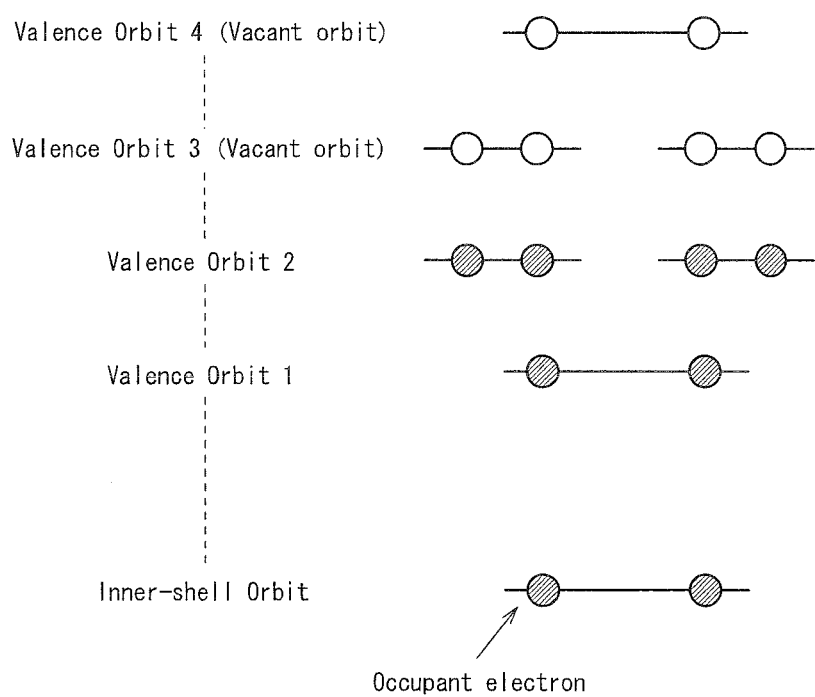
FIG. 14 is a schematic diagram illustrating electronic structures of valence orbits of molecules constituting a specimen.
Figure 15:
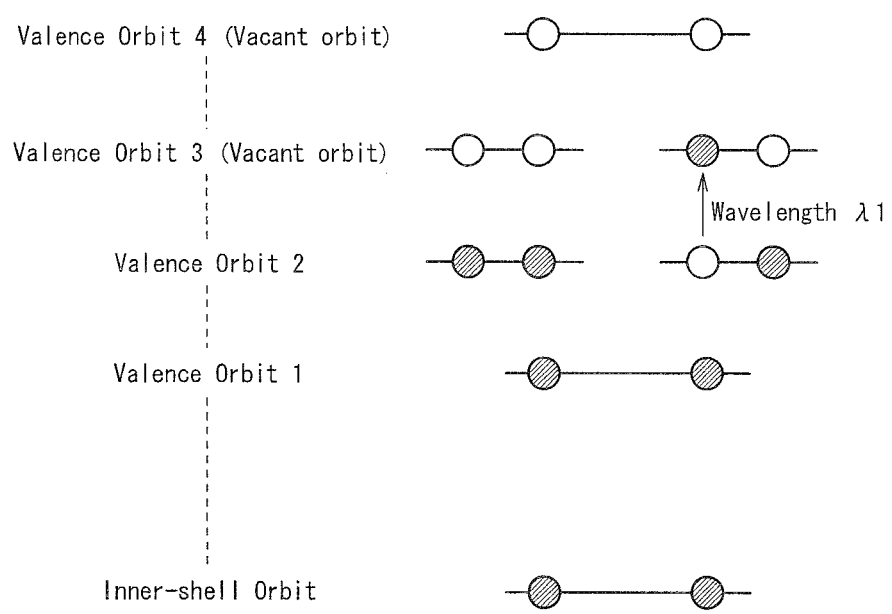
FIG. 15 is a conceptual diagram illustrating a first excited state of molecules illustrated in FIG. 14.
Figure 16:
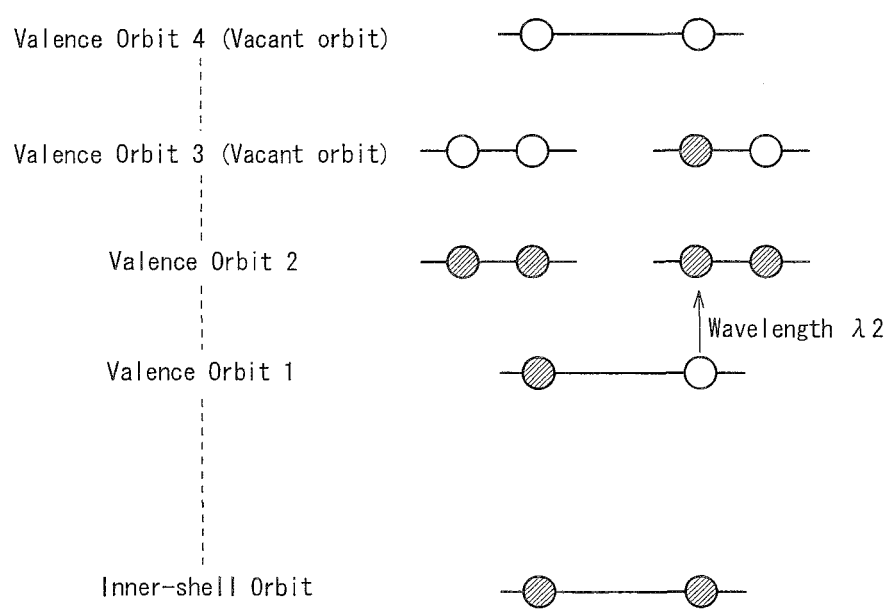
FIG. 16 is a conceptual diagram illustrating a second excited state of molecules illustrated in FIG. 14.
Figure 17:
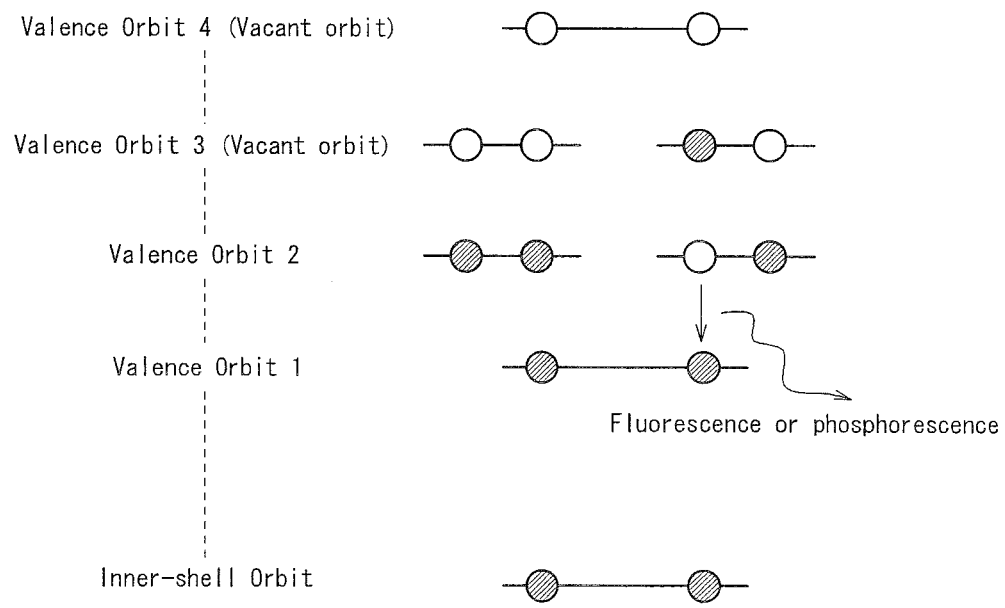
FIG. 17 is a conceptual diagram illustrating a state where molecules illustrated in FIG. 14 return from the second excited state to a ground state.
Figure 18:
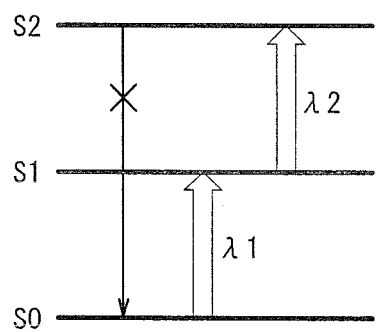
FIG. 18 is a conceptual diagram for explaining a double resonance absorption process of molecules.
Figure 19:
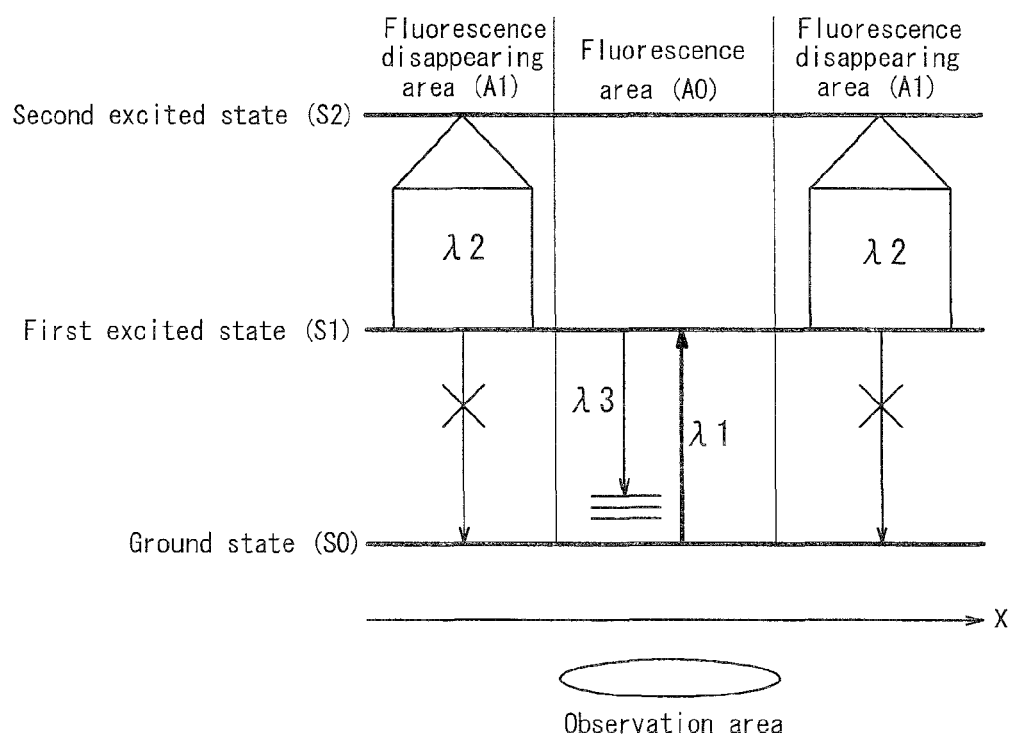
FIG. 19 is a conceptual diagram for explaining the double resonance absorption process of molecules.
Figure 20:
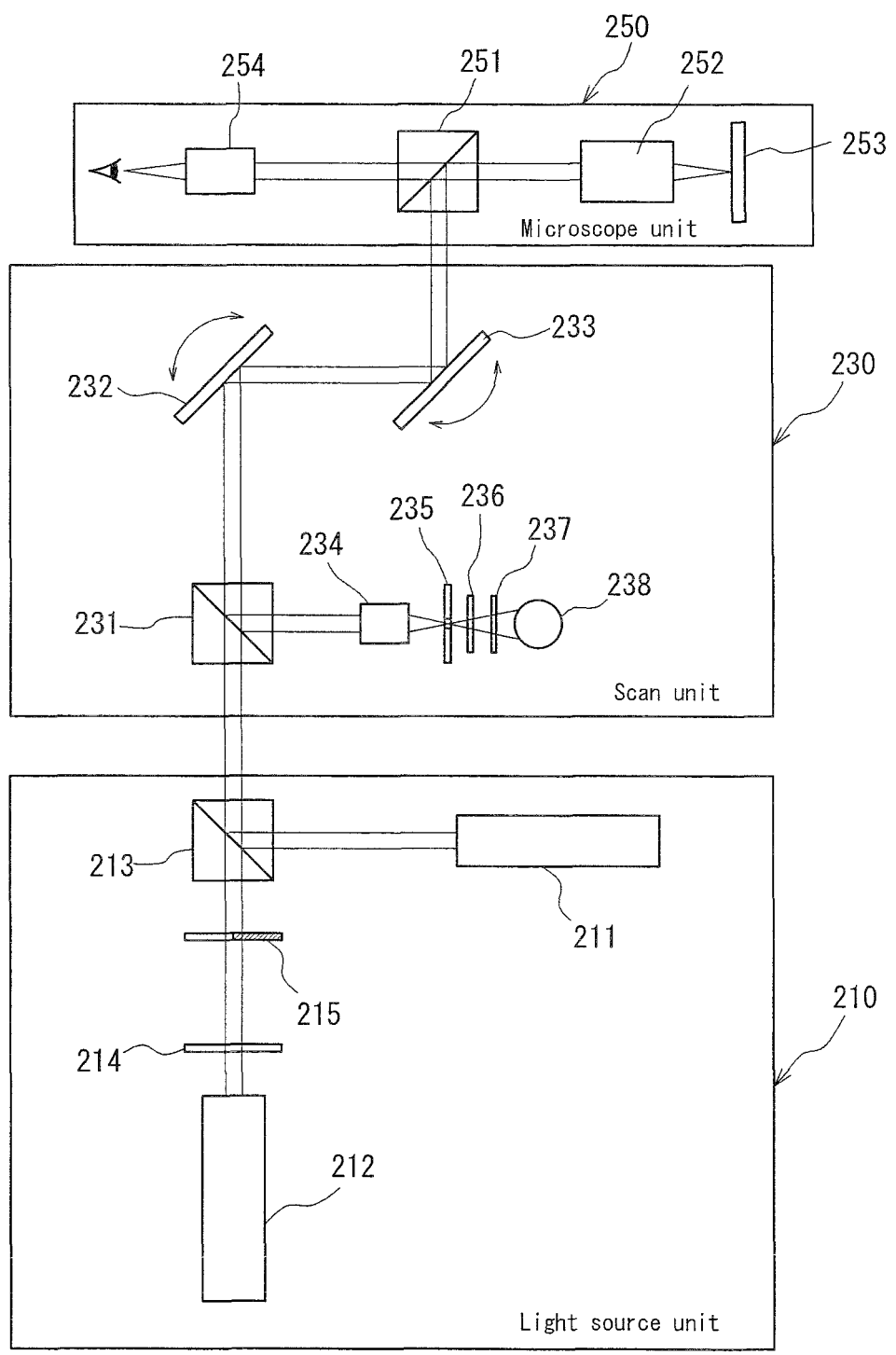
FIG. 20 is a configuration diagram illustrating a main portion of a conventional super-resolution microscope; and, FIG. 21 is an enlarged plan view illustrating a configuration of a phase plate illustrated in FIG. 20.

FIG. 13 is a diagram illustrating a schematic configuration of a main portion of a super-resolution microscope according to Seventh Embodiment of the present invention. In this super-resolution microscope, a microscope objective lens 171 is movable in a plane perpendicular to an optical axis and in an X direction and a Y direction, which are perpendicular to each other, and a light flux can be spatially scanned on a target specimen 172 by the microscope objective lens 171 itself. The excited light and the stimulus light illuminating the target specimen 172 are combined on the same axis and inputted into a fiber 173 as similar to FIG. 8, and, the pump light and the erase light each having the spherical wave and emitted from an emission port of the fiber 173 are converted into a plane wave by a collimator lens 174, and are inputted into the microscope objective lens 171.

In this embodiment, a polarization controlling element 175 having, for example, the configuration exemplarily illustrated in FIG. 4 or FIG. 5 is arranged on an optical path common to the excited light and the stimulus light between the collimator lens 174 and the objective lens 171 of the microscope. Note that the polarizing member of the polarization controlling element 175 is configured so as to function as the quarter wavelength plate or the half-wavelength plate with respect to the stimulus light as similar to the case of the embodiment described above.

According to the super-resolution microscope of this embodiment, the super resolution effect can be easily realized, for example, in a state where the polarization controlling element 175 is centered such that the center thereof coincides with the optical axis as similar to the cases of the embodiments described above, with an easy operation in which rotation adjustment is made in a plane perpendicular to the optical axis. This makes it possible to obtain the sufficient spatial resolution even if the numerical aperture of the microscope objective lens 171 cannot be higher due to the use of the fiber 173.

Note that the present invention is not limited to the embodiments described above, and various modification or changes are possible. For example, in a case where the polarization controlling element is arranged on the optical path common to the excited light and the stimulus light, the polarizing member of the polarization controlling element may be configured to have a polarizing function to the excited light, or be configured to have a polarizing function to both the excited light and the stimulus light. In particular, in the latter case, by using the Fresnel rhomb as the polarizing member, it is possible to make the polarizing member function as the half-wavelength plate or the quarter wavelength plate to both the excited light and the stimulus light. Further, although, in Second Embodiment, the pump light and the erase light are combined on the same axis by using the beam combiner 83 and the single-mode fiber 85, it is possible to combine them on the same axis by using a photosynthesis fiber having two inputs and one output.

Explanation Of Reference Numerals

61 Light source for an excited light
62 Light source for a stimulus light
63 Dichroic mirror
64 Polarizing beam splitter
68 Microscope objective lens
70 Target specimen
71 Polarization controlling element
72 Polarizing member
73 Phase modulation section
78 Light detection unit
80 Light source unit
81 Light source for an excited light
82 Light source for a stimulus light
83 Beam combiner 87 Laser light source
90 Scan unit
98 Light detection unit
100 Microscope unit
102 Microscope objective lens
103 Target specimen
105 Polarization controlling element
106 Polarizing member
107 Multilayer film
121 Light source for an excited light
122 Light source for a stimulus light
123 Dichroic mirror
128 Microscope objective lens
130 Target specimen
131 Polarization controlling element
132 Polarizing member
133 Phase modulation section
137 Spectrograph
138 Light detection unit
151 Microscope objective lens
152 Endoscopic optical system
153 Stick lens
155 Biological sample
161 Polarization controlling element
171 Microscope objective lens
172 Target specimen
173 Fiber
175 Polarization controlling element

What is claimed is:

1. A super-resolution microscope for observing a specimen containing a substance having at least two or more excited quantum state, comprising:
   a light source section that outputs a first illumination light for exciting the substance from a stable state to a first quantum state, and a second illumination light for further transitioning the substance to other quantum state;
   an optical system including a microscope objective lens and condensing the first illumination light and the second illumination light, each outputted from the light source section, onto the specimen in a manner that these lights are partially overlapped with each other;
   a detection section that detects an optical response signal emitted from the specimen in response to condensing of the first illumination light and the second illumination light; and,
   a polarization controlling element provided with a polarizing member that converts a polarization state of the first illumination light or the second illumination light, and a phase modulation section and spatially modulating a phase of the second illumination light, wherein the polarization controlling element comprises the phase modulation section and an area other than the phase modulation section around the phase modulation section concentrically divided when viewed in the axial direction, and wherein the second illumination light that passes through the phase modulation section and the second illumination light that passes through the area other than the phase modulation section have opposite signs in terms of electric-field amplitude.

2. The super-resolution microscope according to claim 1, wherein the polarization controlling element is configured so that the second illumination light has a minimum value of light intensity in an area on the specimen where the second illumination light is partially overlapped with the first illumination light.

3. The super-resolution microscope according to claim 2, wherein the polarization controlling element does not spatially modulate a phase of the first illumination light, and the first illumination light has a maximum value of light intensity on an optical axis in the area on the specimen.

4. The super-resolution microscope according to claim 1, wherein the phase modulation section includes a plurality of areas that are formed to have steps by layering of an optical medium film or by an etching process such that a phase of the second illumination light is reversed at a position symmetrical with respect to an optical axis.

5. The super-resolution microscope according to claim 1, wherein the phase modulation section is formed by a multi-layer film having a reflective effect or a transmission-type phase modulation effect on the first illumination light, and having a transmission-type phase modulation effect on the second illumination light.

6. The super-resolution microscope according to claim 1, wherein the substance is a fluorescent substance, and the second illumination light has a wavelength that inhibits emission of fluorescence of the fluorescent substance.

7. The super-resolution microscope according to claim 1, wherein the substance is a fluorescent substance, the second illumination light has a wavelength that changes a spectrum of fluorescence of the fluorescent substance, and, the detection section is provided with a wavelength-band selection section that transmits the spectrum of the fluorescence emitted from the fluorescent substance in response to irradiation of the first illumination light, and blocks the spectrum of the fluorescence emitted from the fluorescent substance in response to irradiation of the second illumination light.

8. The super-resolution microscope according to claim 1, wherein the polarization controlling element is rotatable around an optical axis of the second illumination light.

9. The super-resolution microscope according to claim 1, wherein the polarization controlling element is of reflective type that deflects the first illumination light or the second illumination light.

10. The super-resolution microscope according to claim 1, wherein the polarization controlling element contains a liquid crystal or photonic crystal as the polarizing member.

11. The super-resolution microscope according to claim 1, wherein the optical system has a stick lens having an endoscopic optical system coupled on an object side of the microscope objective lens.

12. The super-resolution microscope according to claim 1, wherein the microscope objective lens is configured in a manner that can spatially scan the first illumination light and the second illumination light on the specimen.

13. The super-resolution microscope according to claim 1, wherein the phase modulation section is integrally formed with the polarizing member.

14. A super-resolution microscope for observing a specimen containing a substance having at least two or more excited quantum state, comprising:
   a light source section that outputs a first illumination light for exciting the substance from a stable state to a first quantum state, and a second illumination light for further transitioning the substance to other quantum state;
   an optical system including a microscope objective lens and condensing the first illumination light and the second illumination light, each outputted from the light source section, onto the specimen in a manner that these lights are partially overlapped with each other;
   a detection section that detects an optical response signal emitted from the specimen in response to condensing of the first illumination light and the second illumination light; and, a polarization controlling element provided with a polarizing member that converts a polarization state of the first illumination light or the second illumination light, and a phase modulation section and spatially modulating a phase of the second illumination light, wherein the polarizing member functions as a half-wavelength plate with respect to the second illumination light, and polarization directions of the first illumination light and the second illumination light each condensed onto the specimen are parallel.

15. The super-resolution microscope according to claim 14, wherein the substance is a fluorescent substance, and the second illumination light has a wavelength that inhibits emission of fluorescence of the fluorescent substance.

16. The super-resolution microscope according to claim 14, wherein the substance is a fluorescent substance, the second illumination light has a wavelength that changes a spectrum of fluorescence of the fluorescent substance, and, the detection section is provided with a wavelength-band selection section that transmits the spectrum of the fluorescence emitted from the fluorescent substance in response to irradiation of the first illumination light, and blocks the spectrum of the fluorescence emitted from the fluorescent substance in response to irradiation of the second illumination light.

17. The super-resolution microscope according to claim 14, wherein the microscope objective lens is configured in a manner that can spatially scan the first illumination light and the second illumination light on the specimen.

18. The super-resolution microscope according to claim 14, wherein the phase modulation section is integrally formed with the polarizing member.

19. A super-resolution microscope for observing a specimen containing a substance having at least two or more excited quantum state, comprising:
 a light source section that outputs a first illumination light for exciting the substance from a stable state to a first quantum state, and a second illumination light for further transitioning the substance to other quantum state;
 an optical system including a microscope objective lens and condensing the first illumination light and the second illumination light, each outputted from the light source section, onto the specimen in a manner that these lights are partially overlapped with each other;
 a detection section that detects an optical response signal emitted from the specimen in response to condensing of the first illumination light and the second illumination light; and,
 a polarization controlling element provided with a polarizing member that converts a polarization state of the first illumination light or the second illumination light, and a phase modulation section and spatially modulating a phase of the second illumination light, wherein the polarizing member functions as a quarter wavelength plate with respect to the second illumination light, and a polarization direction of at least one of the first illumination light and the second illumination light each condensed onto the specimen is a circularly polarized light.

20. The super-resolution microscope according to claim 19, wherein the substance is a fluorescent substance, and the second illumination light has a wavelength that inhibits emission of fluorescence of the fluorescent substance.

21. The super-resolution microscope according to claim 19, wherein the substance is a fluorescent substance, the second illumination light has a wavelength that changes a spectrum of fluorescence of the fluorescent substance, and, the detection section is provided with a wavelength-band selection section that transmits the spectrum of the fluorescence emitted from the fluorescent substance in response to irradiation of the first illumination light, and blocks the spectrum of the fluorescence emitted from the fluorescent substance in response to irradiation of the second illumination light.

22. The super-resolution microscope according to claim 19, wherein the first illumination light and the second illumination light each condensed onto the specimen are circularly polarized lights having polarizing rotation directions opposite to each other.

23. The super-resolution microscope according to claim 19, wherein the microscope objective lens is configured in a manner that can spatially scan the first illumination light and the second illumination light on the specimen.

24. The super-resolution microscope according to claim 19 wherein the phase modulation section is integrally formed with the polarizing member.

* * * * *